(12) United States Patent
Broemstrup et al.

(10) Patent No.: US 10,090,651 B2
(45) Date of Patent: Oct. 2, 2018

(54) MOUNTING FRAME FOR A SWITCHGEAR CABINET OR A RACK

(75) Inventors: Dennis Broemstrup, Osnabrueck (DE); Siegfried Boehme, Wolfen (DE); Heiko Holighaus, Eschenburg (DE); Matthias Mueller, Dillenburg (DE); Michael Schnakenberg, Wallenhorst (DE)

(73) Assignee: Rittal GmbH & Co. KG, Herborn (DE)

( * ) Notice: Subject to any disclaimer, the term of this patent is extended or adjusted under 35 U.S.C. 154(b) by 682 days.

(21) Appl. No.: 13/261,719

(22) PCT Filed: Feb. 17, 2012

(86) PCT No.: PCT/DE2012/000155
§ 371 (c)(1),
(2), (4) Date: Oct. 28, 2013

(87) PCT Pub. No.: WO2012/116672
PCT Pub. Date: Sep. 7, 2012

(65) Prior Publication Data
US 2014/0044474 A1    Feb. 13, 2014

(30) Foreign Application Priority Data
Feb. 28, 2011   (DE) .................. 10 2011 013 159

(51) Int. Cl.
*H02B 1/30* (2006.01)

(52) U.S. Cl.
CPC ............... *H02B 1/30* (2013.01); *H02B 1/303* (2013.01); *Y10T 403/42* (2015.01)

(58) Field of Classification Search
CPC ......... H02B 1/30; H02B 1/303; Y10T 403/42; Y10T 403/34; Y10T 403/341;
(Continued)

(56) References Cited

U.S. PATENT DOCUMENTS 2,956,705 A * 10/1960 Clingman .......... A47B 47/0008
217/12 R
3,380,768 A *  4/1968 Wolfensberger ... A47B 47/0008
312/140
(Continued)

FOREIGN PATENT DOCUMENTS

CA    2645605 A1   9/2007
DE    8410203 U1   7/1984
(Continued)

*Primary Examiner* — Matthieu F Setliff
(74) *Attorney, Agent, or Firm* — Marshall & Melhorn, LLC

(57) ABSTRACT

A mounting frame for a switchgear cabinet or a rack includes mounting pieces which are arranged, as corner pieces, in the four corner sections of a rectangle or square that extends in an x-y plane, the mounting pieces being produced in a respective shaping process and having outer first and second mounting faces which extend in the x direction and in the y direction at a right angle thereto and which extend in a space direction z at a right angle to the x-y plane, and are provided with hollow spaces which are at least partially surrounded by wall parts and/or bores that are oriented in the z direction. The mounting frame further includes intermediate elements which extend between the mounting pieces in the x direction and in the y direction and the end sections of which are fastened to the mounting pieces. The mounting pieces have wall sections which extend in parallel to the x-y plane, thus making assembly easier.

15 Claims, 29 Drawing Sheets

(58) Field of Classification Search
CPC ............. Y10T 403/342; Y10T 403/343; Y10T 403/344; Y10T 403/345; Y10T 403/346; Y10T 403/347; Y10T 403/348; Y10T 403/349; Y10T 403/44; Y10T 403/443; Y10T 403/447; Y10T 403/72; Y10T 403/725
See application file for complete search history.

(56) References Cited

U.S. PATENT DOCUMENTS

| | | | | |
|---|---|---|---|---|
| 3,715,136 | A * | 2/1973 | Yoshida | A47B 87/02 217/65 |
| 3,815,966 | A * | 6/1974 | Lyman, Jr. | B62B 3/002 312/351.12 |
| 3,890,738 | A * | 6/1975 | Bassani | G09B 25/04 446/111 |
| 3,973,855 | A * | 8/1976 | Florence | A63H 33/105 403/171 |
| 4,358,213 | A * | 11/1982 | Hawkins | F16B 12/28 403/205 |
| 4,470,647 | A * | 9/1984 | Bishoff | F16B 5/07 312/108 |
| 4,493,425 | A * | 1/1985 | Yoshida | A47B 47/0033 206/504 |
| 4,691,970 | A * | 9/1987 | Neri | A47B 47/0008 312/140 |
| 4,869,380 | A | 9/1989 | Metcalfe et al. | |
| 4,878,777 | A | 11/1989 | Debus et al. | |
| D362,509 | S * | 9/1995 | Russell | D25/61 |
| 5,624,160 | A * | 4/1997 | Koch | B64D 11/06 297/440.16 |
| 5,655,821 | A | 8/1997 | Laboch et al. | |
| 5,695,263 | A | 12/1997 | Simon et al. | |
| 6,350,000 | B1 * | 2/2002 | Van Benthem | E04H 1/1238 312/236 |
| 6,390,719 | B1 * | 5/2002 | Chan | E04B 1/5806 403/205 |
| 6,408,482 | B1 * | 6/2002 | Henriott | A47B 21/06 16/29 |
| 6,701,570 | B2 * | 3/2004 | Henriott | A47B 21/06 16/18 R |
| 8,915,390 | B2 * | 12/2014 | Meyer-Horn | B65D 9/12 206/600 |
| 8,961,058 | B2 * | 2/2015 | Haimoff | F16B 12/46 403/170 |
| 2010/0108300 | A1 | 5/2010 | Hoehne | |
| 2012/0170972 | A1 * | 7/2012 | Song | H05K 7/18 403/169 |
| 2012/0269571 | A1 * | 10/2012 | Haimoff | F16B 12/46 403/205 |

FOREIGN PATENT DOCUMENTS

| | | |
|---|---|---|
| DE | 3710567 C1 | 6/1988 |
| DE | 9308162 U1 | 1/1994 |
| DE | 4310079 A1 | 9/1994 |
| DE | 19537015 C1 | 10/1996 |
| DE | 19534551 C1 | 3/1997 |
| DE | 69601910 T2 | 8/1999 |
| DE | 69604603 T2 | 5/2000 |
| DE | 19860406 C1 | 10/2000 |
| DE | 10328407 A1 | 1/2005 |
| DE | 202006020037 U1 | 8/2007 |
| DE | 102007013520 A1 | 9/2008 |
| EP | 0725464 A1 | 8/1996 |
| EP | 0686316 B1 | 11/1996 |
| EP | 0762819 A1 | 3/1997 |
| GB | 2212879 A | 8/1989 |
| WO | 02/080322 A1 | 10/2002 |
| WO | 2007/104406 A1 | 9/2007 |

* cited by examiner

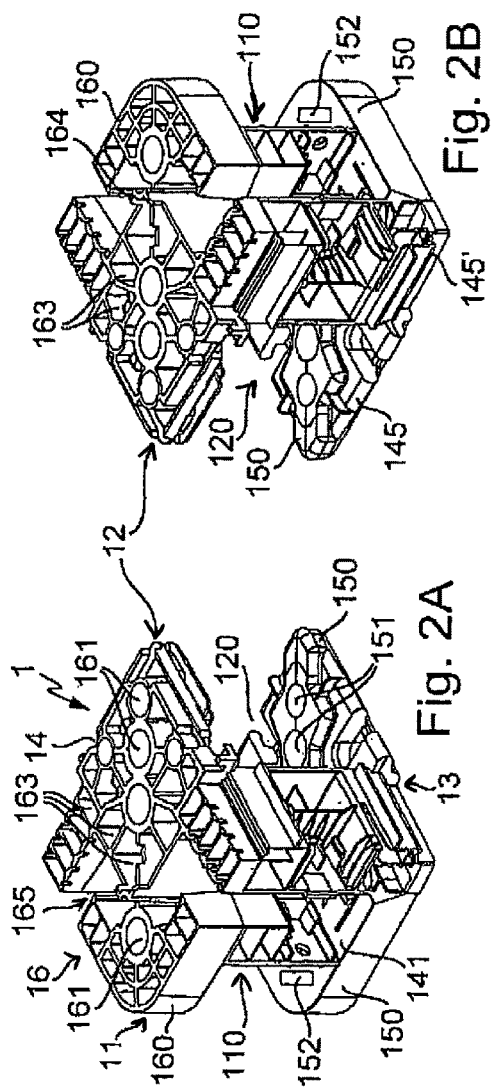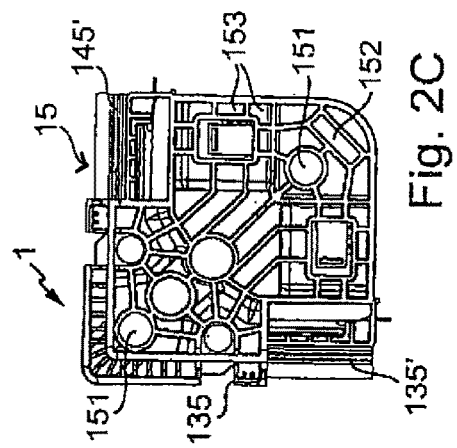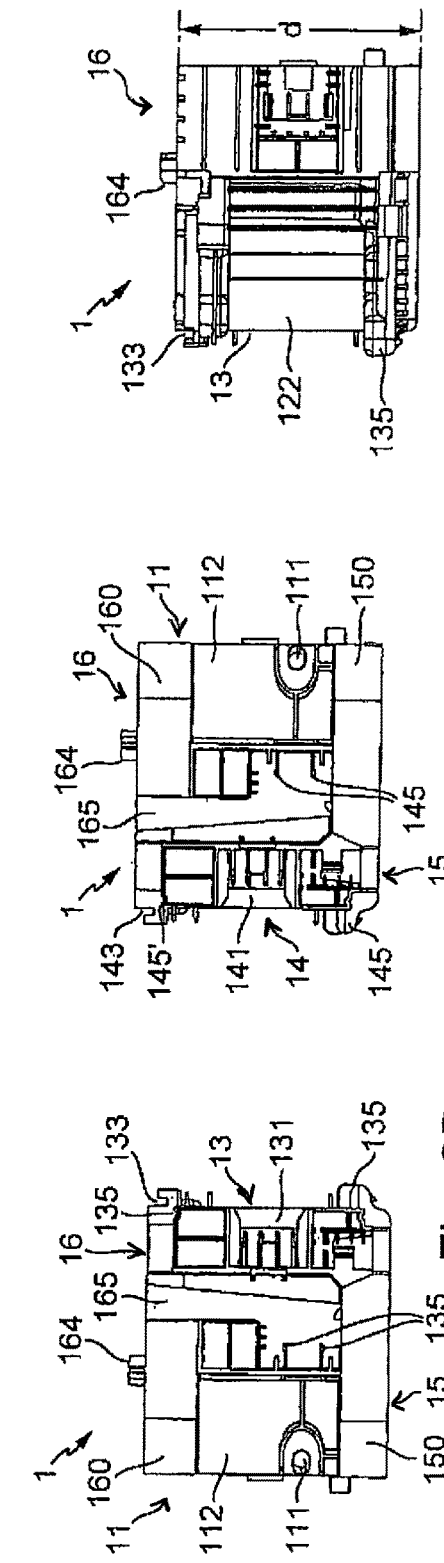

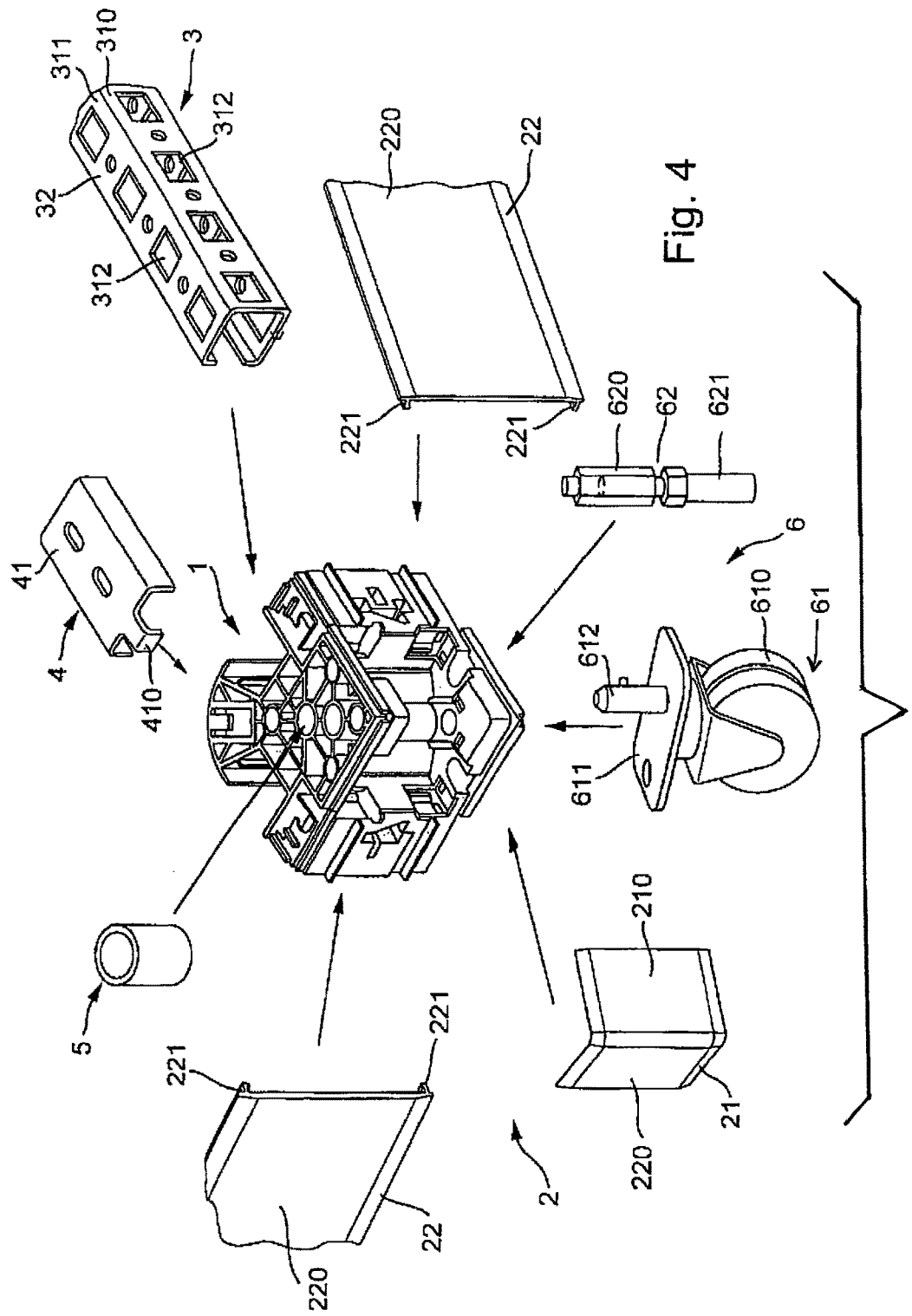

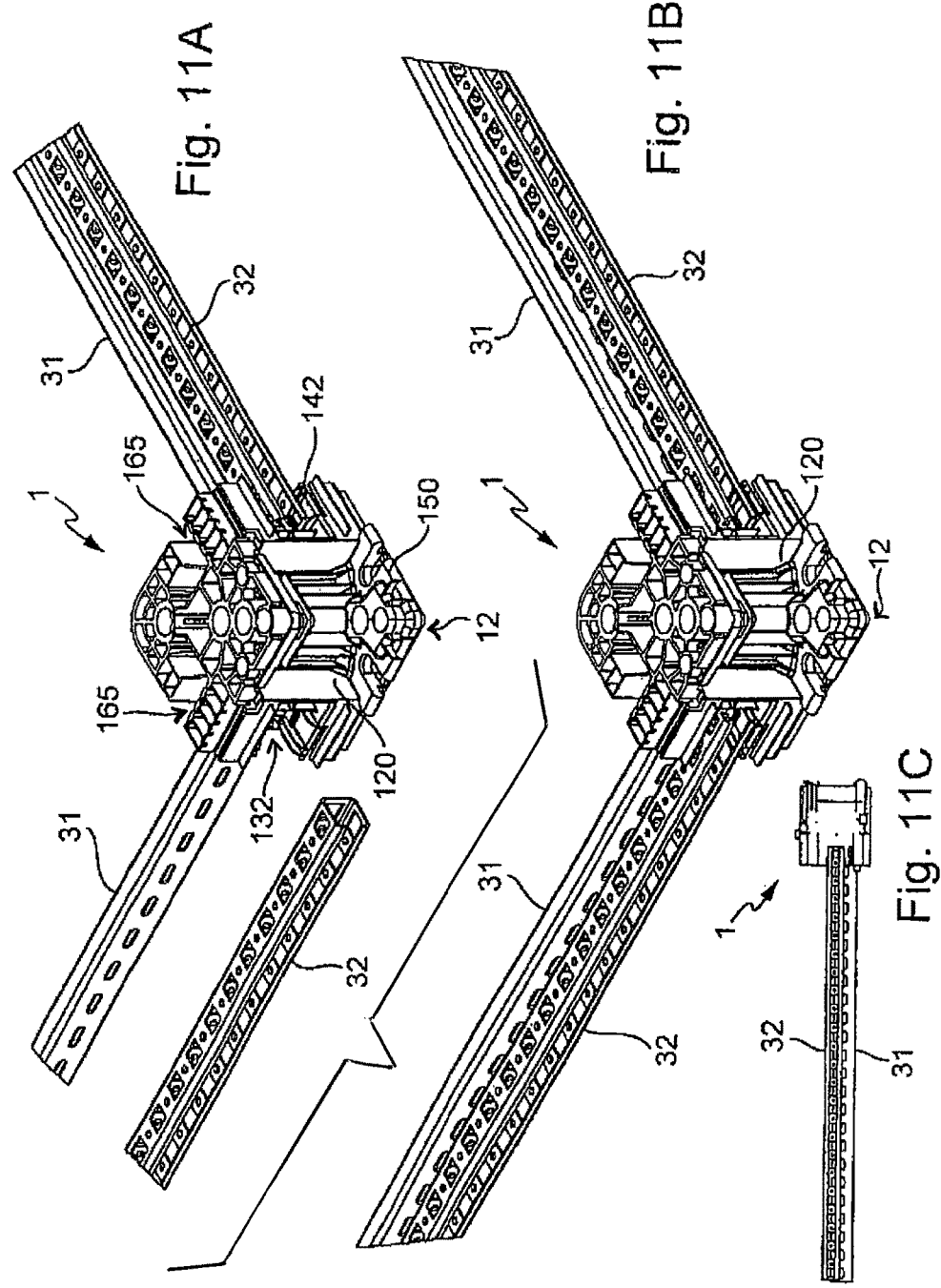

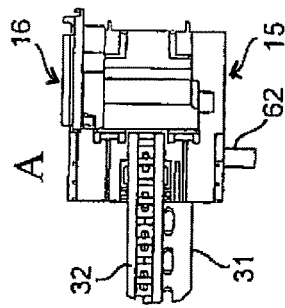
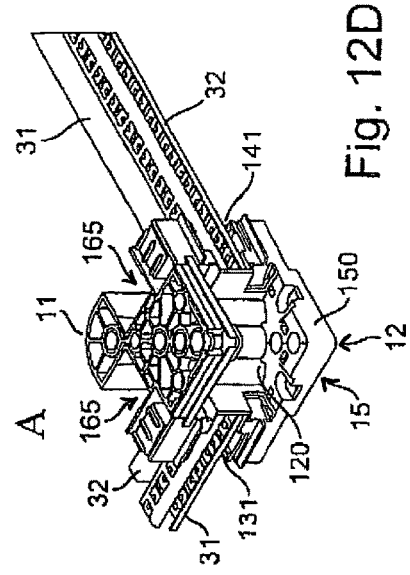
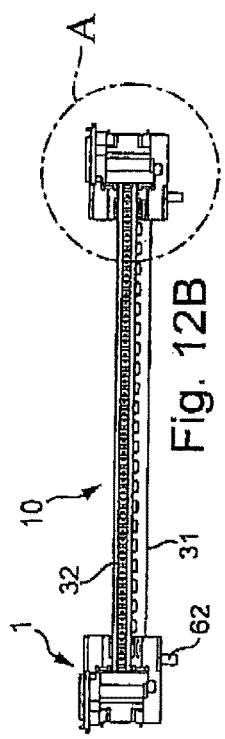
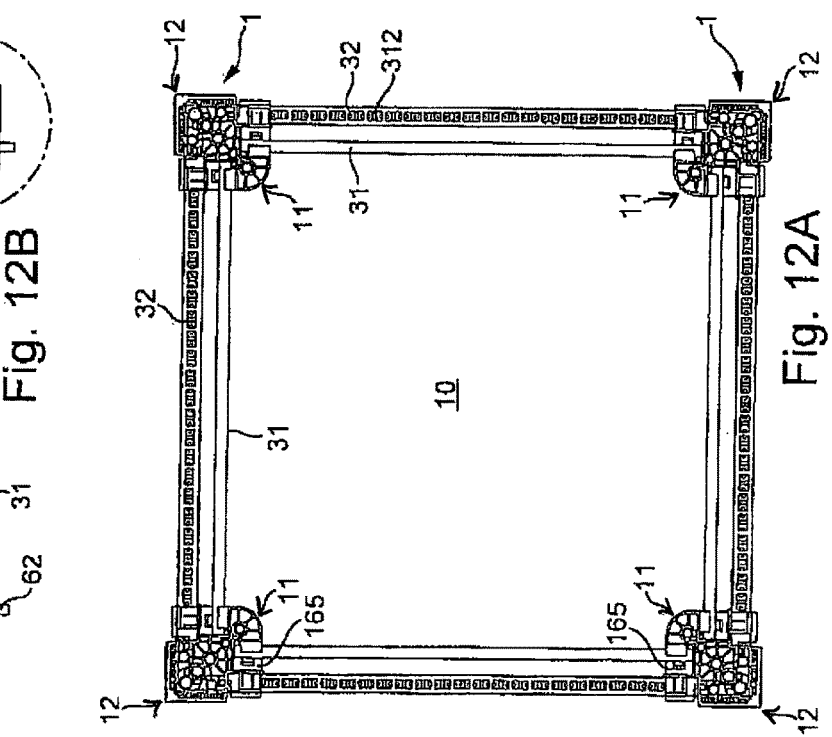

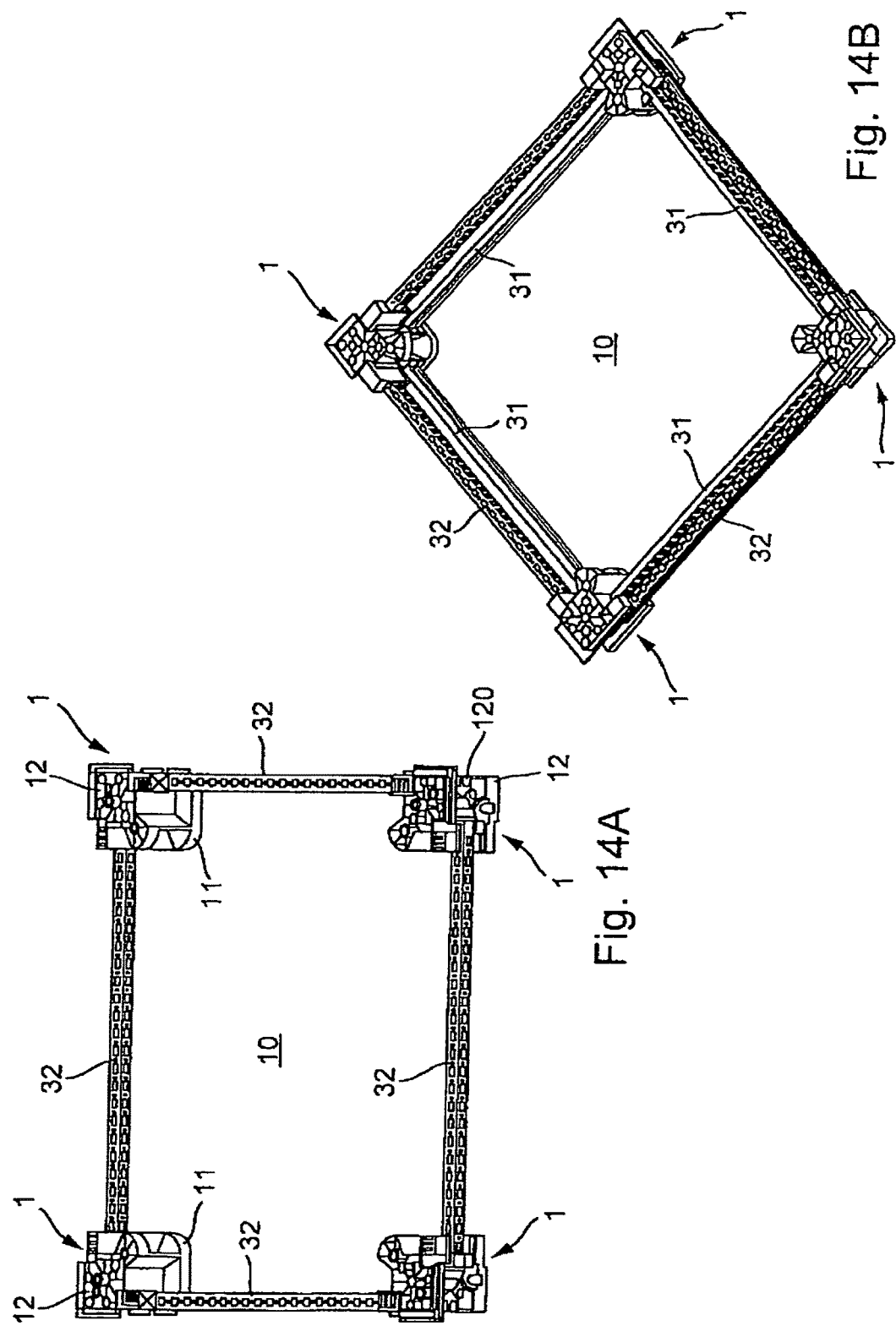

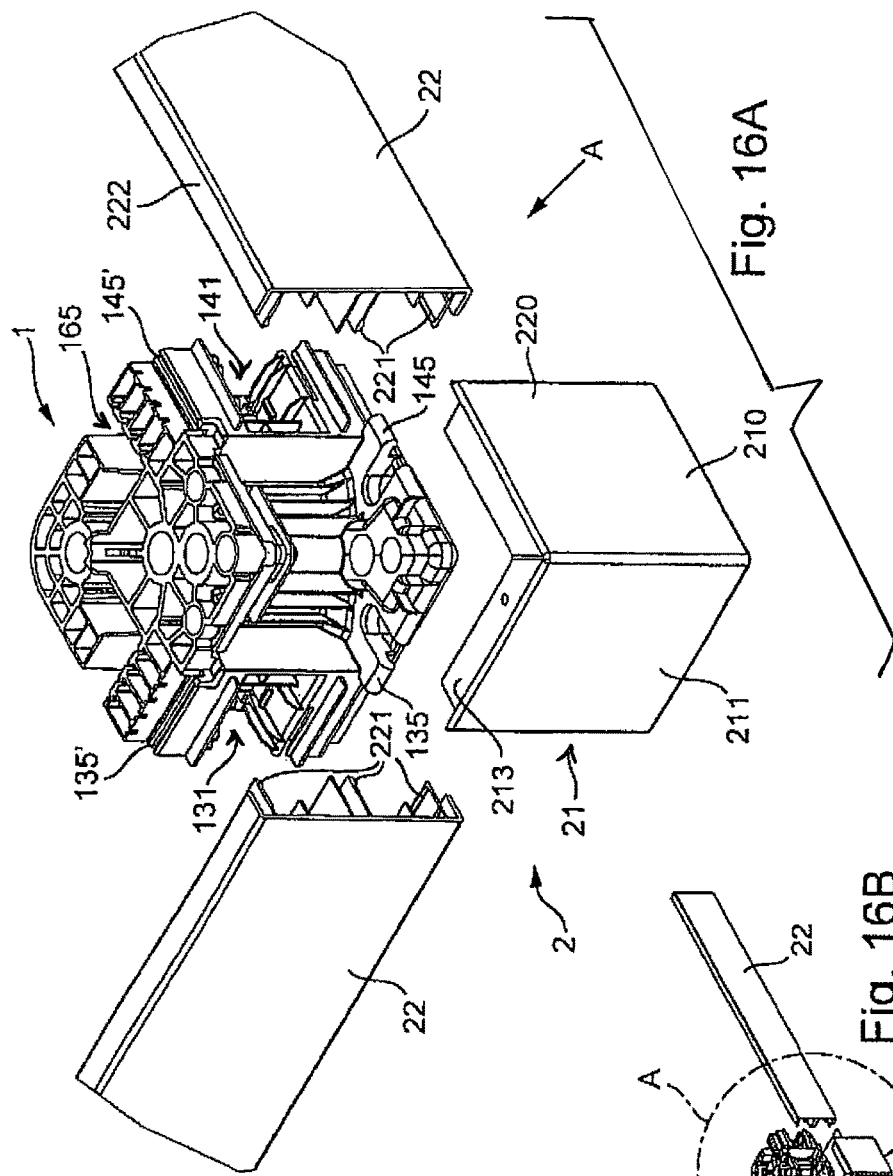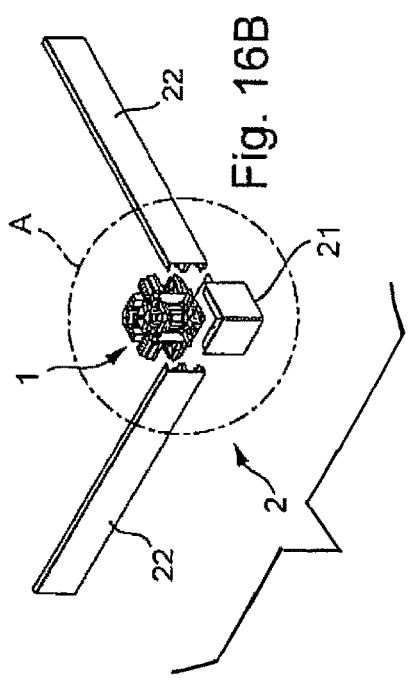

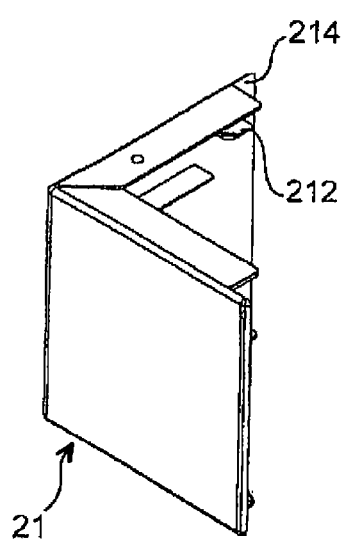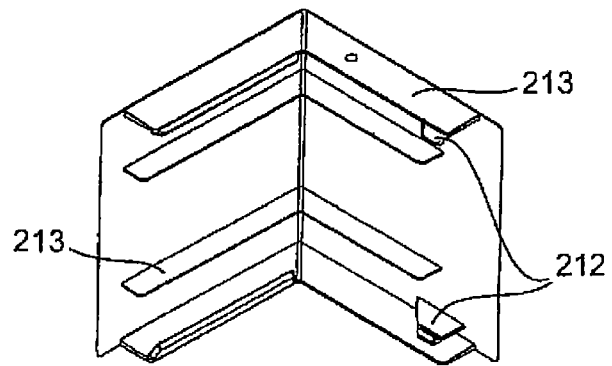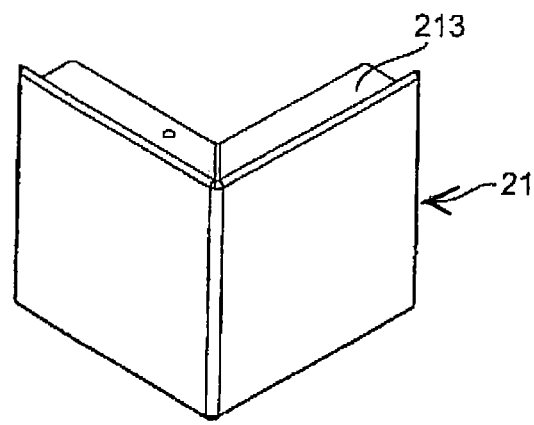
Fig. 17B
Fig. 17C
Fig. 17A

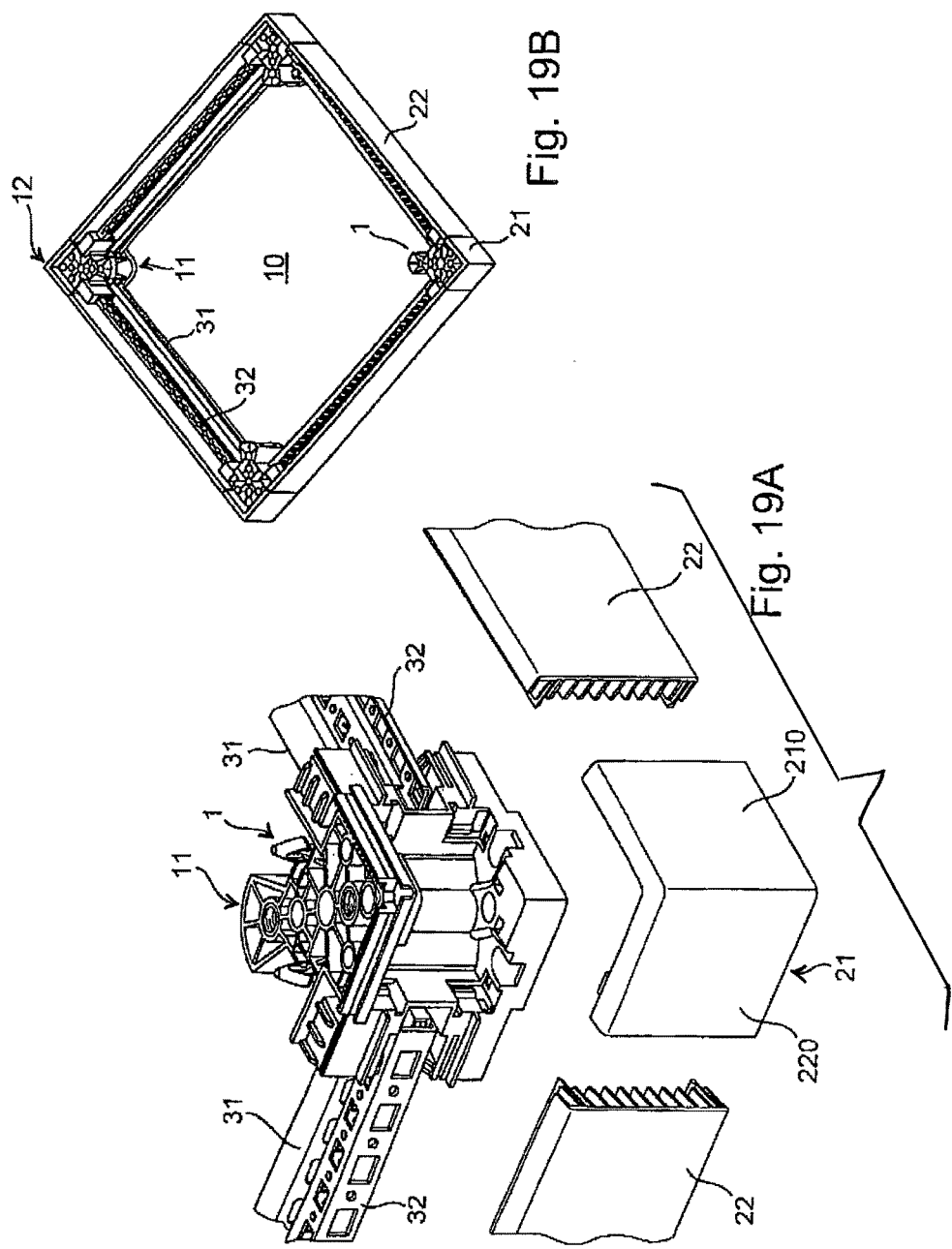

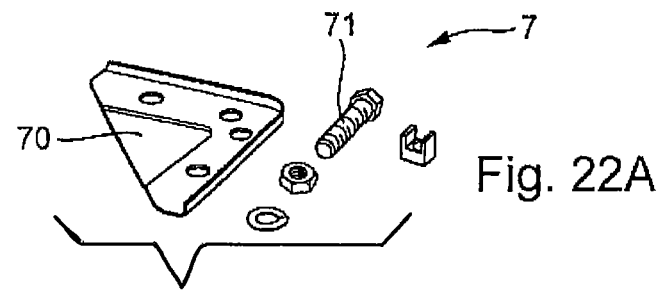
Fig. 22A
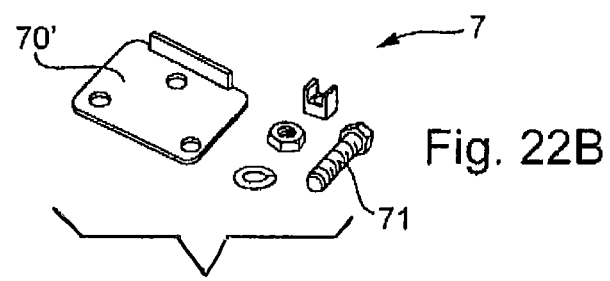
Fig. 22B
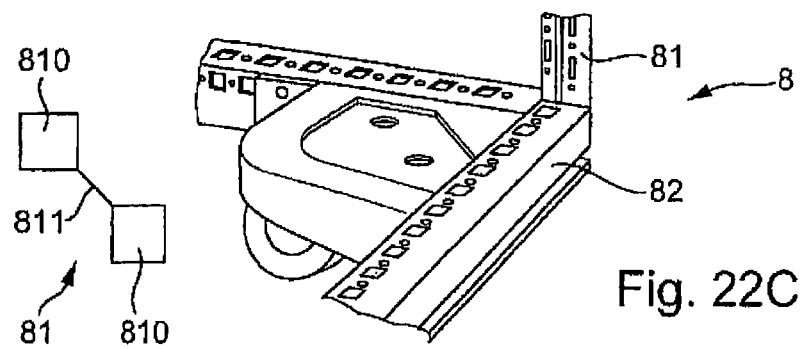
Fig. 22C
Fig. 22D
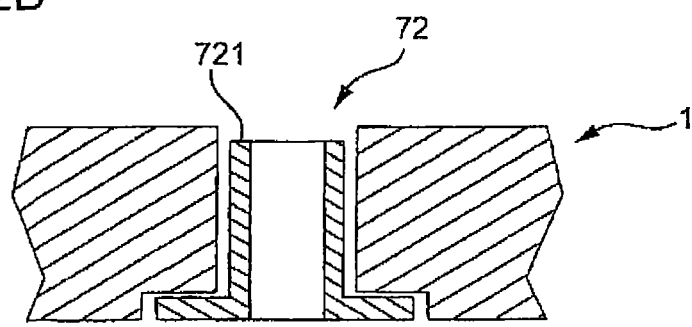
Fig. 22E

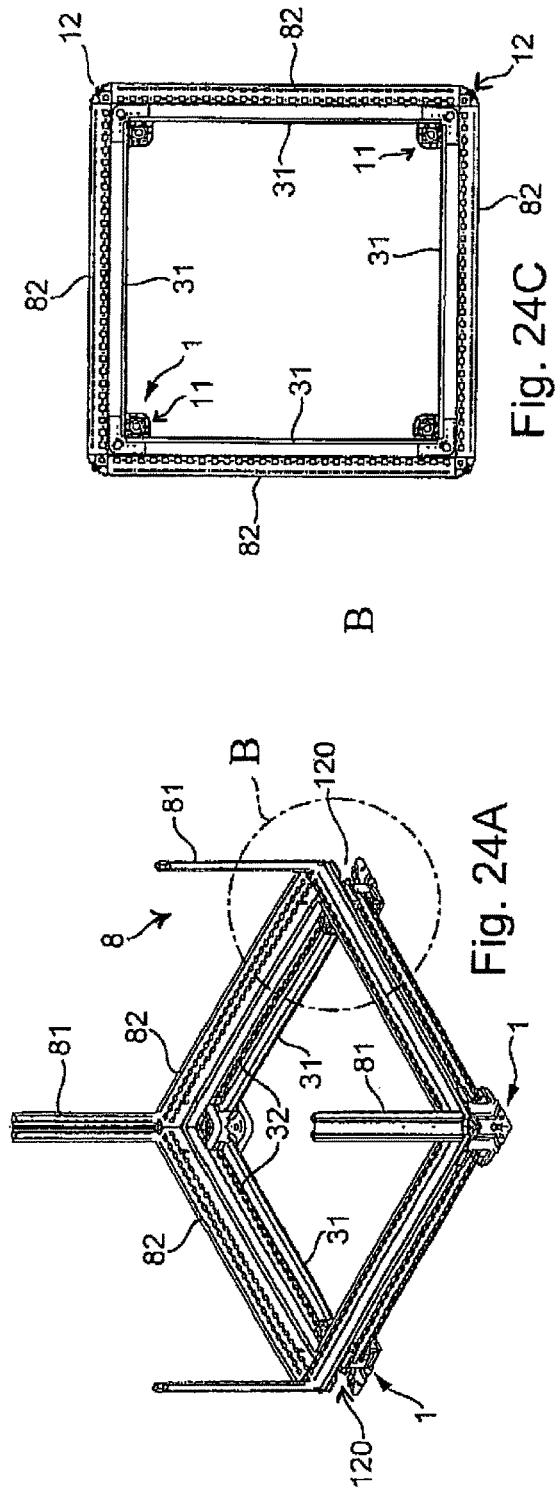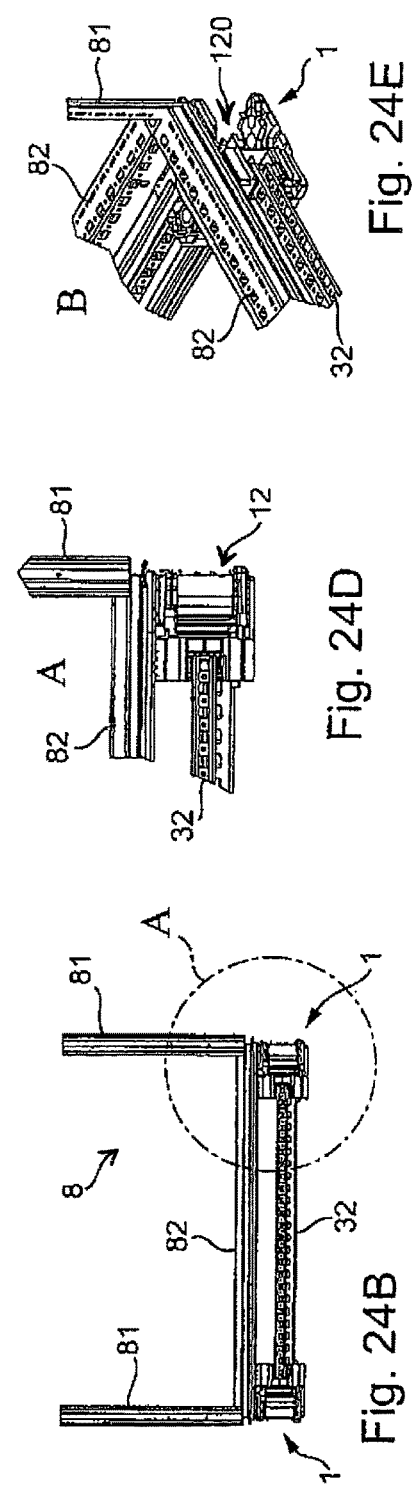

MOUNTING FRAME FOR A SWITCHGEAR CABINET OR A RACK

BACKGROUND OF THE INVENTION

The invention relates to a mounting frame for a switchgear cabinet or a rack, comprising mounting pieces which are arranged, as corner pieces, in the four corner regions of a rectangle or square that extends in an x-y plane, said mounting pieces being produced in a respective shaping process and having outer first and second mounting faces which extend in the x direction and in the y direction at a right angle thereto and which extend in a space direction z at a right angle to the x-y plane, and are provided with hollow spaces which are at least partially surrounded by wall parts and/or bores that are oriented in z direction, and comprising intermediate elements which extend between the mounting pieces in the x direction and in the y direction and the end sections of which are fastened to the mounting pieces.

A mounting frame of this type is disclosed in DE 195 34 551 C1, wherein the mounting frame forms a socket of a switchgear cabinet. In the corner regions of the socket, which is rectangular in a top view, mounting pieces are arranged as corner pieces which are connected to another by lateral covers. The corner pieces formed as upright standing profile sections made of an extruded aluminum material comprising several partly open and partly closed cavities running in longitudinal direction of the profile and confined by wall parts. The mounting faces lying outside with respect to the socket comprise slots running in longitudinal direction of the profile to rearwardly positioned cavities forming T-shaped fastening grooves for mounting the covers. Often it is desired to have more flexible mounting and design possibilities for a mounting frame, such as e.g. a socket.

In a further socket shown in EP 0 725 464 B1, the corner pieces comprise an upper and a lower connecting plate which are connected to another via rib-shaped vertical walls. The upper connecting plate is provided with means for fastening the corner piece at the framework of a switchgear cabinet, while the lower connecting plate comprises means for fastening the corner piece at the bottom. Also for such socket adapted to the framework, there are restrictions of design possibilities.

The same applies for sockets as shown in DE 10 2007 013 520 A1, WO 02/080322 A1, DE 37 10 567 C2, DE 84 10 203 U1, DE 43 10 079 C2, DE 93 08 162 U1, DE 103 28 407 A1 and EP 0 686 316 B1. Those known sockets comprise corner pieces configured as angled punch/bent parts, wherein introducing of additional mounting elements can generate considerable mounting effort.

SUMMARY OF INVENTION

The invention is based on the object to provide a mounting socket for a switchgear cabinet or a rack of the type mentioned in the introductory which offers various design possibilities for different requirement of a switchgear cabinet or rack.

This object is solved by a mounting frame for a switchgear cabinet or a rack that includes mounting pieces which are arranged, as corner pieces, in the four corner regions of a rectangle or square that extends in an x-y plane, the mounting pieces being produced in a respective shaping process and having outer first and second mounting faces which extend in the x direction and in the y direction at a right angle thereto and which extend in a space direction z at a right angle to the x-y plane, and are provided with hollow spaces which are at least partially surrounded by wall parts and/or bores that are oriented in the z direction, and including intermediate elements which extend between the mounting pieces in the x direction and in the y direction and the end sections of which are fastened to the mounting pieces, the mounting pieces having wall sections which extend in parallel to the x-y plane.

The construction of the mounting piece and intermediate elements connected thereto offers advantageous extension possibilities also later on, wherein also connection of the switchgear cabinet or rack via the respective frame sections can be made with simple measures with the aid of structures provided at the facing side of the mounting pieces. By means of all sections extending in parallel to the x-y plane, supplementary mounting possibilities are generated. The wall sections oriented in the relevant space directions, in particular also in z direction, result in benefits for the manufacturing process by molding and further for stable supporting structures in z direction.

An advantageous configuration for mounting possibilities, in particular also in z direction, results in that the mounting pieces terminate in z direction in a first and a second base face oriented in the x-y plane, the second base face being parallel and spaced apart from the first base face by a distance, both forming the outer face of at least a first and at least a second base wall section.

For a stable defined connection to a switchgear cabinet or a rack, further the measures are beneficial that at least one base face comprises receiving structures adapted to a facing section of the framework or a rack or that adapter elements, in particular adapter plates are provided, on one side thereof, are adapted to the receiving structures of the base face and, on the opposite side, are provided with adapter structures mating the facing section of the framework.

Favorable mounting possibilities further result in that the mounting faces are spaced apart from another at their facing ends and form a first corner space in the relevant virtual corner region of the mounting piece. The corner space in the outer region of the mounting frame offers the possibility to arrange mounting element, while being easy to access. If similar to that also the vertical edge region of first switch gear cabinet or the framework thereof, respectively, is provided with a corresponding free space, as it is the situation for switchgear cabinets of the applicant, the entire vertical edge region can be advantageously used for installation purposes even in the outer socket region in a systematic sequence, wherein the corner space can be easily covered by means of covers, e.g. a corner cover, and is, if needed, easy to access.

The corner region above and below the corner space can be used advantageously and offers defined abutment positions, if it is provided that the first corner space is confined by adjacent ends of the mounting faces on both sides by means of a respective corner region bordering wall, which are perpendicularly oriented with respect to the relevant mounting face and in z direction and that the first corner space is confined in z direction by the first and second base wall sections. For example, stands, caster wheels or leveling elements can be mounted and supported advantageously in this way.

Further advantages for easy mounting with unique configuration result in that the receiving structures comprise protrusions on the relevant base face.

Further, those measures are beneficial for mounting that the bores are provided with internal threads or with thread inserts.

Mounting possibilities are favorized in that the mounting pieces comprise further perpendicularly connected wall sections at the interior of the ends of the first and the second mounting face facing away from another, which wall sections are integrally connected to another, and that a further wall section leave a second corner space between their facing ends, which is laterally confined by second corner region bordering walls lying parallel to the neighboring mounting faces and oriented in z direction and by the first and second base wall sections in z direction.

For flexible mounting possibilities, further the measures contribute that the receiving structures comprise first and second receiving chambers which are oriented perpendicularly to the first space direction z and parallel to the associated mounting phase and which are at least partly surrounded by wall sections running in their orientation direction.

Mounting and installation work is further favorized in that intermediate elements, in particular mounting rails having at least one row of holes or a rail having C-shaped cross section inserted into the receiving chambers are present. For example, it is advantageous that the rows of holes comprise the same hole distance as a framework of the switchgear cabinet or rack or profile rails provided therein having corresponding rows of holes, in particular if the rows of holes of the mounting rails and in the switchgear cabinet are aligned in x, y and/or z direction. C-rails may e.g. beneficially serve as cable securing rails. Mounting of those intermediate elements is simple if the mounting pieces are already provided with holding structures, such as formed fastening holds, formed locking elements and/or retaining ribs and retaining grooves, which are adapted to such intermediate elements.

A further advantageous embodiment consists in that laterally and in the corner region covering lateral covers and corner covers made of plastic or metal are present which are fixed and/or supported at the mounting piece and/or a mounting rails. By these covers, a simple covering of the interior surrounded by the frame as well as of installation elements and even an adaption to a switchgear cabinet plating is possible.

Advantageous manufacturing results when the mounting piece is formed as a plastic molded part.

A beneficial use of the mounting frame consist in a socket or an intermediate frame for a switchgear cabinet or a rack.

The mounting piece may be manufactured advantageously block-like, wherein the dimensions in x, y and z direction differ e.g. at most by the factor 2.

BRIEF DESCRIPTION OF THE DRAWINGS

The invention is explained in detail below by exemplary embodiments with reference to the drawing. There is shown in FIGS. 1A and 1B illustrations of a mounting piece in a perspective view onto two opposite corner regions, FIGS. 2A and 2B further perspective views of the mounting piece (with reference to a mounting state from the inwardly left hand side and inwardly right hand side, respectively), FIGS. 2C to 2F further different views of the mounting piece (with reference to a mounted state seen from downward, from an inwardly left hand side, from an inwardly right hand side or in a front view, respectively), FIGS. 3A and 3B further perspective views of the mounting piece (with reference to a mounted state seen from inwardly or from outwardly, respectively), FIGS. 3C to 3F different views of the mounting piece (with reference to a mounted state seen from the top, from the right hand side, from the front side or from the left hand side, respectively), FIG. 4 the mounting piece with various mounting elements to be fixed thereto in a perspective view, FIGS. 5A and 5B perspective views of a mounting piece having leveling elements arranged in a corner region during an assembling procedure, FIG. 6 the mounting piece in a perspective view having a support stand arranged in a corner region, FIG. 7 a sectional view of a construction unit, for example a socket, having a mounting piece, a mounting rail and a C-shaped rail as well as anchoring means in a perspective view, FIGS. 8A and 8B a sectional view of a construction unit having the mounting piece, a mounting rail, a C-rail and a castor unit mounted to the mounting piece, or, in addition, an anchoring means, respectively, FIG. 9A the mounting piece having a mounted castor unit, FIGS. 9B, 9C and 9D different castor units having holding members and support plates, FIG. 10A another exemplary embodiment of a castor unit with holding member in a perspective view, FIG. 10B examples for attaching a castor unit of FIG. 10A to the mounting piece, FIG. 11A a sectional view of a construction unit having a mounting piece and C-rails and a mounting rail fixed thereto as well as a mounting rail to be mounted thereto in a perspective view, FIG. 11B the construction unit of FIG. 11A with mounted C-rails and mounting rails, FIG. 11C the construction unit of FIG. 11A in a lateral view, FIGS. 12A to 12D a construction unit which is square in a top view, having four mounting pieces as corner pieces as well as connecting intermediate elements in form of mounting rails and C-rails in a top view, lateral view and two enlarged views of a cut-out in the corner region, FIG. 13 the construction unit of FIG. 12A in a perspective view, FIG. 14A a rectangular construction unit having mounting pieces arranged in the corner regions and connecting mounting rails in a perspective view, FIG. 14B another exemplary embodiment of a square construction unit having mounting pieces arranged in the four corner regions and connecting mounting rails and C-rails in a perspective view, FIG. 15A as a cut-out, a construction unit in a perspective view, having a mounting piece and mounting rails fixed thereto in a perspective view from the outside, FIG. 15B as a cut-out, a construction unit having a mounting piece and C-rails fixed thereto in a perspective view from the inside, FIGS. 16A and 16B an exploded view of a corner region having a mounting piece and covers in a downsized and enlarged view, FIGS. 17A to 17C a corner cover in various perspective views, FIGS. 17D to 17F further views of the corner cover, FIG. 18A a perspective view of a side cover, FIG. 18B the lateral cover of FIG. 18A in a front end view, FIG. 19A a corner region of a construction unit, for example a socket, partly in an exploded view, having a mounting piece, C-rails mounted thereto and mounting rails, as well as covers, removed therefrom, FIG. 19B a square construction unit, for example a socket, having mounting pieces arranged in four corner regions, mounting rails, C-rails as well as covers connecting these and mounted thereto, FIG. 20 a corner region of another construction unit having a mounting piece, different mounting rails fixed thereto as well as a C-rail mounted thereto, FIG. 21 a sectional view of two adjacent construction units in a row having two mounting pieces, a connecting mounting rail as well as another mounting rail fixed to a corner piece and a mounted C-rail, FIGS. 22A and 22B various adapter elements having different adapter plates to be mounted to a mounting piece, FIG. 22C a sectional view of a framework of a switchgear cabinet having a castor unit mounted thereunder, FIG. 22D a cross section of a vertical frame profile, FIG. 22E an example of a receiving unit, e.g. for a castor unit, FIG. 23 two mounting pieces which are neighboring in z direction or height direction, respectively, and are connected to another, FIG. 24A a lower section of a framework of a switchgear cabinet or rack arranged on a socket having mounting pieces in a perspective view, FIG. 24B a lateral view of the section of the framework of FIG. 24A which is fixed on the socket, FIG. 24C a top view of a framework section of FIG. 24A mounted on a socket, FIG. 24D a cut-out of a corner region with framework in the socket region of FIG. 24B, FIG. 24E a cut-out of a corner region with framework in a socket region of FIG. 24D, FIG. 25 a perspective view of a part of a framework mounted on a socket, partly in a perspective view, FIG. 26 a partial view of two neighboring sockets with adjacent framework fixed thereto, partly in a perspective view, FIG. 27A a corner region of a socket having a mounting piece, a corner cover and two side covers in a schematic illustration in a perspective view, FIG. 27B another corner region of a socket with switchgear cabinet fixed thereto, having a paneling piece and socket covers in a perspective schematic view, FIG. 27C a corner cover in a top view, FIG. 28 a sectional view of a switchgear cabinet provided with lateral parts and a socket provided with covers in a perspective view and FIG. 29 a lower section of a framework mounted to a socket together with lifting arms of a lifting equipment which are introduced thereunder.

DETAILED DESCRIPTION OF THE INVENTION

Figure 1A:
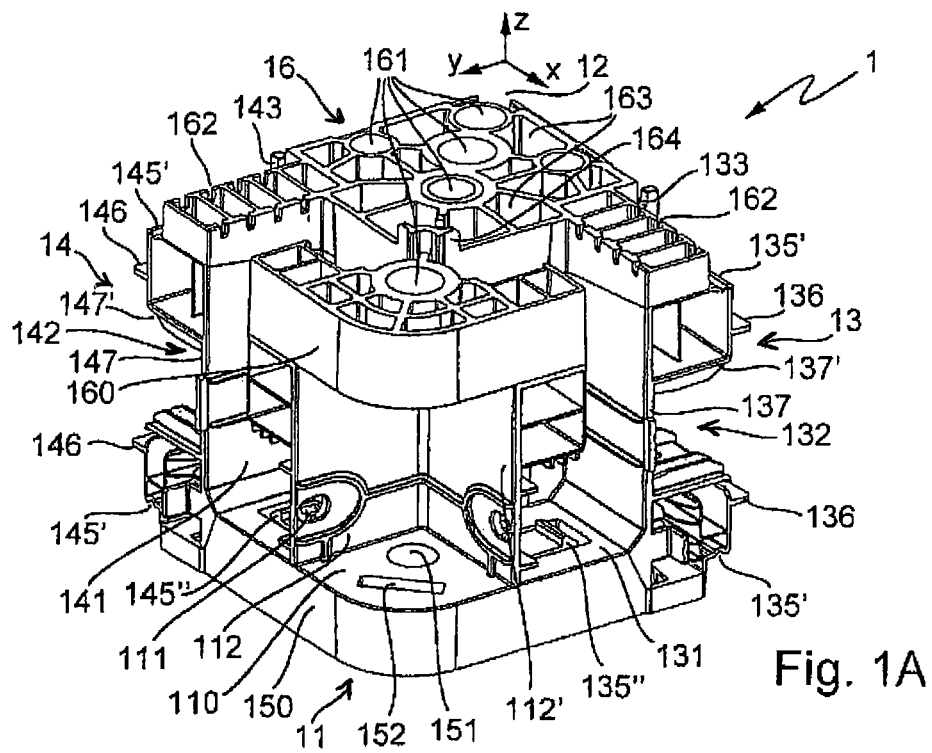
Figure 1B:
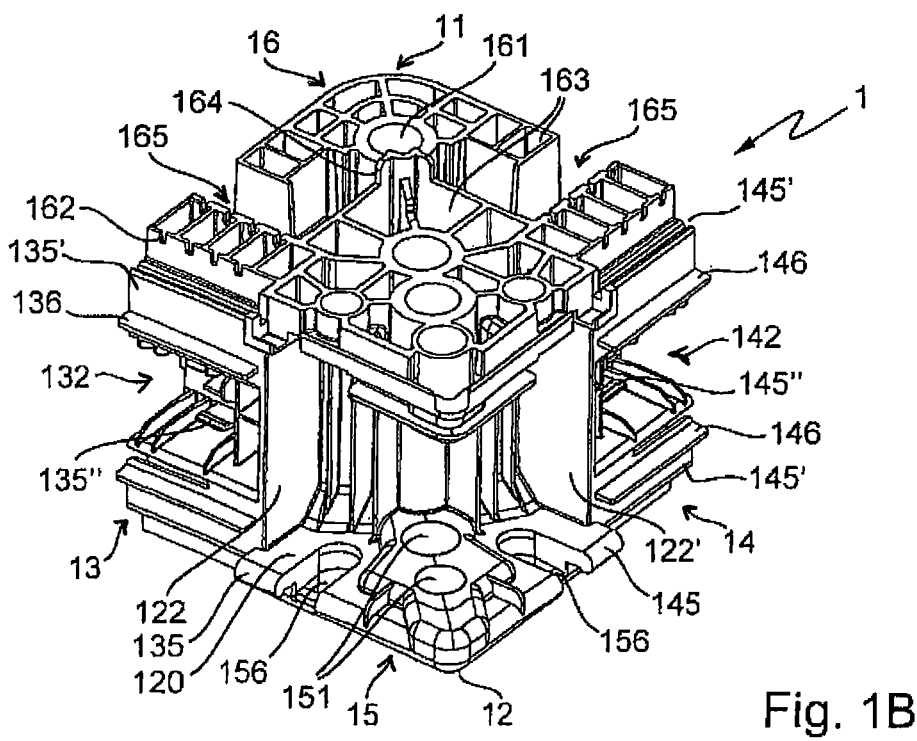
Figure 3C:
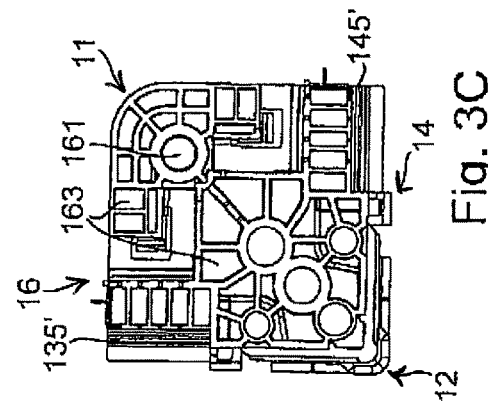
Figure 3B:
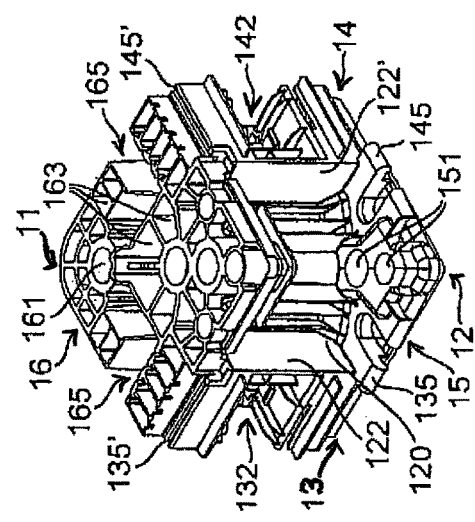
Figure 3A:
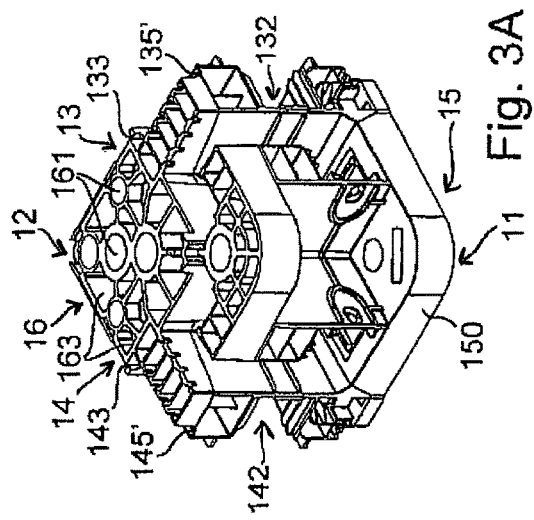
Figure 3F:
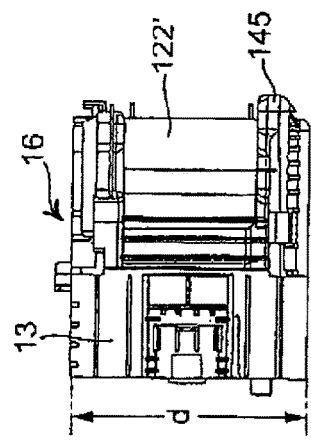
Figure 3E:
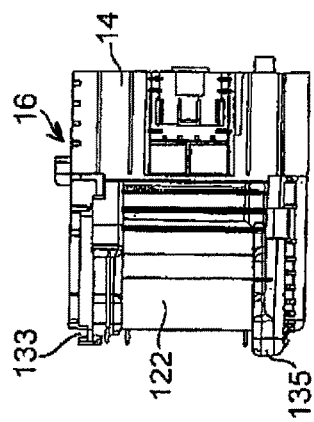
Figure 3D:
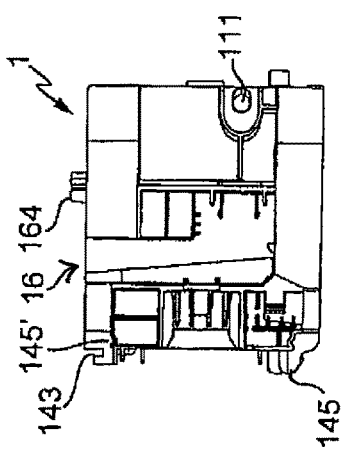

FIGS. 1A and 1B as well as also FIGS. 2A to 2F and 3A to 3F illustrate a mounting piece 1 in various views. Mounting piece 1 is used as a fundamental construction part of a construction unit, such as e.g. a socket 10 (e.g. FIG. 13 and FIG. 24A) or another mounting frame, for mounting to a switchgear cabinet or rack or another housing, preferably as a corner piece in the corner regions of the construction unit which is preferably rectangular or square in a top view.

Mounting pieces 1 which are arranged in the corner regions are connected by longitudinal extending intermediate elements, such as mounting rails 32, rails 31 which are C-shaped in cross section (C-rails) and/or lateral covers.

Mounting piece 1 is formed as a molded part produced in a molding process, preferably as a plastic molded part or alternately as a metal molded part, in particular made of a nonferrous metal, for example of aluminum, or as a molded part of a compound material comprising fiber material which is artificial and/or consists of renewable raw materials which is e.g. embedded into a plastic matrix. It possesses a block-like, roughly rectangular or cubic shape with lateral parts oriented in three perpendicular space directions, x, y, z as apparent from FIG. 1A.

Preferably, the ratio of two respective pairs of dimensions in x-, y-, z direction is not more than 2:1, at best 3:1, the smallest dimension in one of the three space direction being at least 5 cm and the largest at most 20 cm. In a construction unit of the previously mentioned configuration with mounting pieces 1, the z direction of mounting piece 1 is perpendicular with respect to the rectangular or square, respectively, extension plane of the construction unit, while x- and y direction are running parallel to (or in, respectively) the direction of the sides of the construction unit.

As can be seen in the exemplary embodiment of FIGS. 1A and 1B as well as in FIGS. 2A to 2F and 3A to 3F, it is symmetrically formed with respect to a vertical diagonal plane extending in z direction which extends from an outer corner region 12 of the mounting piece 1 (referred to below as a first corner region) to the opposite inner corner region 11 of mounting piece 1 (referred to below also as a second corner region), as mounted in a construction unit, and is, on all outer sides, provided with receiving structures for mounting elements of different type, including for example also the mentioned rails 3, namely C-rails 31 and mounting rails 32, as well as arrangement of covers 2, in particular lateral covers 22 and corner covers 21 (cp. e.g. FIG. 16A).

As can be further seen in FIGS. 1A and 1B as well as in FIGS. 2A to 2F and 3A to 3F, first and second receiving chambers 132, 142 are formed which are recessed from a first mounting face 13 parallel to the x-z-plane, or lying there within, and from a second mounting face 14 parallel to the y-z-plane or lying therein, respectively, and which are oriented in x direction or y direction and are open at their front end facing the relevant mounting face 13 or 14, respectively, as well as to the opposite ends of mounting faces 13, 14. Having this configuration, end sections of rails 3 can be inserted from the relevant mounting face 13 or 14, respectively, so that even in an assembled state of a construction unit, later on rails 3 or similar intermediate elements can be added or removed. Moreover, rails 3 or the like can be introduced or inserted, respectively, through the open front ends, so that e.g. benefit of an initial mounting process of a construction unit may result. Furthermore, fixing elements are formed within the first and second receiving chambers 132, 142, which include first and second locking catches 135", 145" comprising preferably locking pins fixed to resilient tongues having locking slopes which are flat towards a relevant mounting face and locking steps which are steep inwardly, wherein the locking catches are perpendicular to the relevant mounting face 13, 14 in y direction or x direction, respectively, so that rails 3 or the like which are inserted from the relevant mounting face 13, 14 are retained in a locked manner against their insertion direction. The length of the locking catches to the steep locking steps is advantageously adjusted to established cross sections of rails 3 or distances to the rims of fixing holes arranged therein, so that rails 3 or the like intermediate elements are fixed in a correct position. The width of the locking catches 135", 145" extending in x direction or y direction, respectively, is further advantageous adjusted to the width of relevant rectangular or square fixing holes in particular of an established row 312 of holes. Moreover, also the dimensions of the receiving chambers 132, 142 are advantageously adjusted to the cross section contour of rails 3 or the like, so that a trouble-free insertion and a unique seat result.

Receiving chambers 132, 142 are surrounded by wall sections which are at the top and bottom sides with respect to the vertical direction (or z direction, respectively) and parallel to the x-y plane and by another wall section 137, 147 parallel to the relevant mounting face 13 or 14, respectively, wherein in the interior of receiving chamber 132, 142 in the exemplary embodiment as shown additionally reinforcing ribs are formed. The mentioned locking catches 135", 145" are e.g. formed at a bordering wall of the relevant receiving chamber 132, 142 parallel to the mounting face.

As e.g. can be clearly seen in FIG. 1A, further receiving chambers 131, 141 are provided behind the wall section 137 or 147, respectively, which is parallel to the relevant mounting face 13, 14 and which confine the relevant receiving chamber 132, 142 at its rear side, which receiving chambers 131, 141 are continuously confined by further wall sections, except for a gap 165 directed upwardly in z direction, and which are open only at their front ends towards the ends of mounting faces 13, 14 facing away from another. Likewise, rails 3, such as C-rails 31 or mounting rails 32 can be introduced or inserted, respectively, into these additional receiving chambers, namely from the top side through gap 165 or from the front side. Likewise, connecting elements are located within those receiving chambers 131, 141, for example additional resilient locking catches 135", 145" which are formed thereto which are adjusted to cross sectional contours of rails 3 or distances to hole rims, respectively, to fix rails 3 or the like. The connecting elements can further comprise fixing or positioning ribs which are adjusted to cross sectional contours of rails 3 or the like and which in addition result in a stiffening of wall sections. Moreover, fixing holes 111 may be provided for introducing further fixing elements into wall sections which are accessible from the outside. In an alternate embodiment (not illustrated), the additional receiving chambers 131, 141 or other additional receiving chambers can be open and accessible from inner sides spaced apart from the mounting faces.

Furthermore, the receiving structures on the mounting faces 13, 14 include further grooves 133, 143, additional locking catches 135, 145 or 135', 145', the latter extending along the relevant mounting faces 13, 14 in x direction or y direction, respectively, and comprising longitudinally extending grooves formed in ridge-shaped holdings at the outside of mounting faces 13, 14, wherein pairs of grooves having grooves open upwardly in a z direction and downwardly on the respective mounting face 13 or 14, respectively, which are preferably located in the same plane which is parallel to the x-z direction or y-z direction, respectively. Opposing locking noses which are formed e.g. on lateral covers 22 or corner covers 21, can be snapped into these pairs of grooves. Furthermore, bolt-like locking catches 135, 145 having downwardly extending locking pins are formed on the outside of the mounting faces. Further, bar-like ribs 136, 146 are formed on the mounting faces 13, 14 running in x direction or y direction, respectively, which serve to position covers 2 and/or for stiffening. Furthermore, wall sections 137, 137' surrounding receiving chambers 131, 132 or 141, 142, respectively, serve, apart from positioning, for stiffening mounting piece 1.

Figure 13:
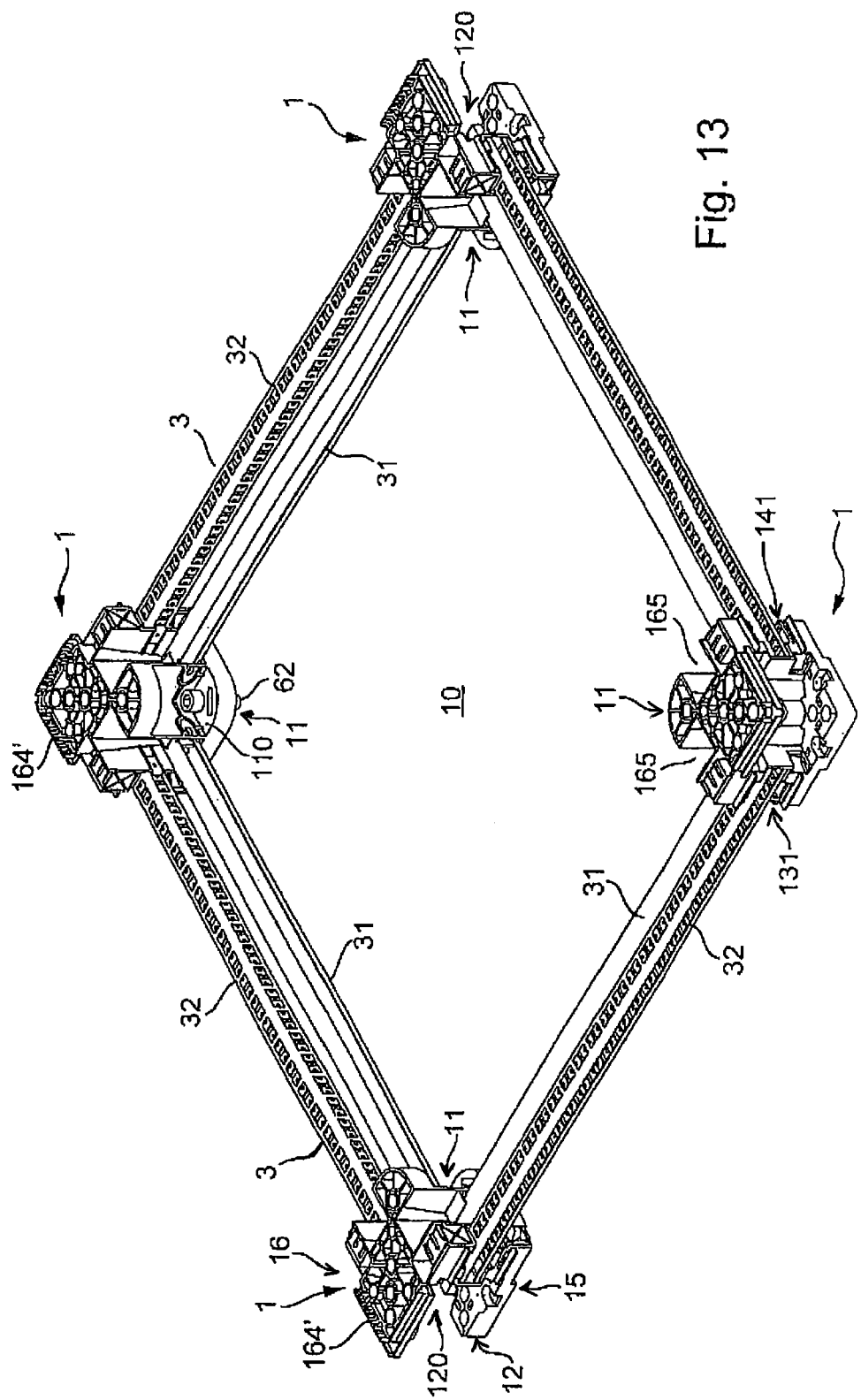

Mounting piece 1 is confined in z direction by a first base face 15 (at the bottom in a mounted state) and a second base face 16 (at the top in a mounted state) which form the outside of a first or second base wall section 150, 160, respectively, and extend in planes parallel to the x-y plane. Chamber-like cavities 153 (cp. also FIG. 20) and 163 which are open to the outside, are formed perpendicular (in z direction) to the relevant base face 15, 16 in the base wall sections, which cavities are completely or partly confined (compared to the clear opening width) thin wall sections. Further, gaps 165 connected with receiving chambers 131, 141 lead into the second upper base face 16. Moreover, cylindrical holes or bores are formed into both base faces 15, in the exemplary embodiment as shown diagonally from the first to the second corner region 12, 11 as well as adjacent thereto extending in z direction, wherein at least some of the cylindrical bores 151, 161 are aligned to another within both base wall sections. As shown in FIG. 1A, a slot 152 is formed into the second corner region 11 in the first base wall section 140 transversely to the diagonal between the two corner regions 11, 12. Further, slot-like structures 162 are formed into the outside of the second base section 160. Further, structures protruding outwardly in z direction can be formed on the base faces 15, 16, in particular on the upper base face 16, such as protrusion 164 or bar-like protrusions 164' (cp. FIG. 13) extending in x direction and in y direction, for uniquely positioning construction components to be mounted to the upper side of mounting piece 1, such as e.g. sections of a framework, a socket cover or adapter plates. Moreover, the above mentioned cavities 163 or 153, respectively, and bores 161, 151 can be used for positioning purposes.

As further shown in FIGS. 1A and 1B as well as in FIGS. 2A to 2F and 3A to 3F, three corner spaces 110 or 120, respectively, are formed within corner regions 11, 12. Here, further mounting elements can be inserted from the outside with free accessibility, wherein the corner space which is outside with respect to a construction unit can be covered with covers 2, in particular a corner cover 21. The corner cover can be fixed on the one hand, e.g. with the aid of resilient locking elements formed on the interior side thereof and correspondingly positioned, having locking slopes on the input side and steep locking steps acting against the input direction at locking catches 135, 145 and on the other hand in grooves 133, 143 which are upwardly opened.

Figure 5A:
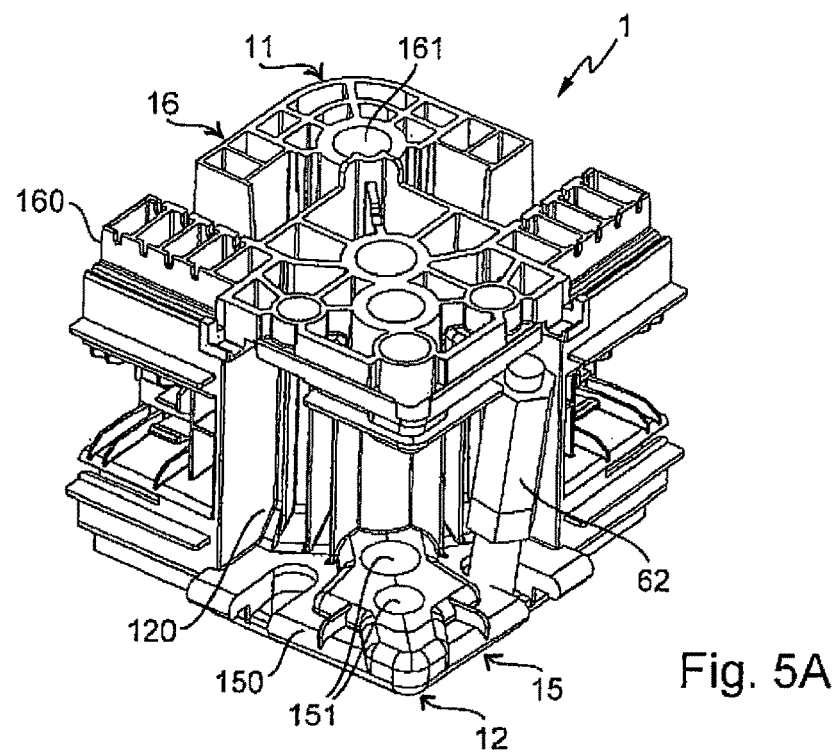
Figure 5B:
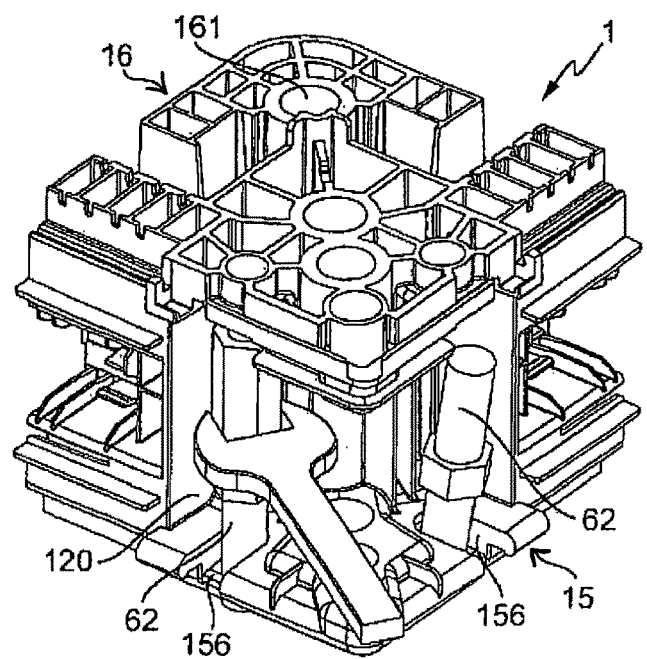

The first or outer, respectively, corner region 12 is formed in that mounting faces 13, 14 are spaced apart at their ends facing to another and form a free corner space in the corresponding first (in so far virtual) corner region 12 of mounting piece 1. First corner space 120 is separated from receiving chambers 132, 142 on both sides by means of respective corner region bordering walls 122, 122', said corner region bordering walls 122, 122' being perpendicular to the respective mounting face 13, 14 and oriented in z direction. In z direction, first corner space 120 is confined by first and second base wall sections 150, 160. Bores 151, 161 arranged in the base wall sections confining first corner space 120 are aligned. Further, open recesses 156 are introduced into a side of the lower base wall section 150 facing the first corner space, which are open from the walls laterally from the diagonal to the respective mounting face 13, 14, so that the corresponding bores 151 are better accessible for inserting mounting elements, as is shown in FIGS. 5A and 5B, wherein as a mounting element an adjustable leveling unit 62 is inserted into the aligned bores of the first and second base wall sections 150, 160. Both base wall sections 150, 160 form abutment rims for a cover defined at their outer rims, in particular for corner cover 21, so that a defined corner region is formed.

Figure 7:
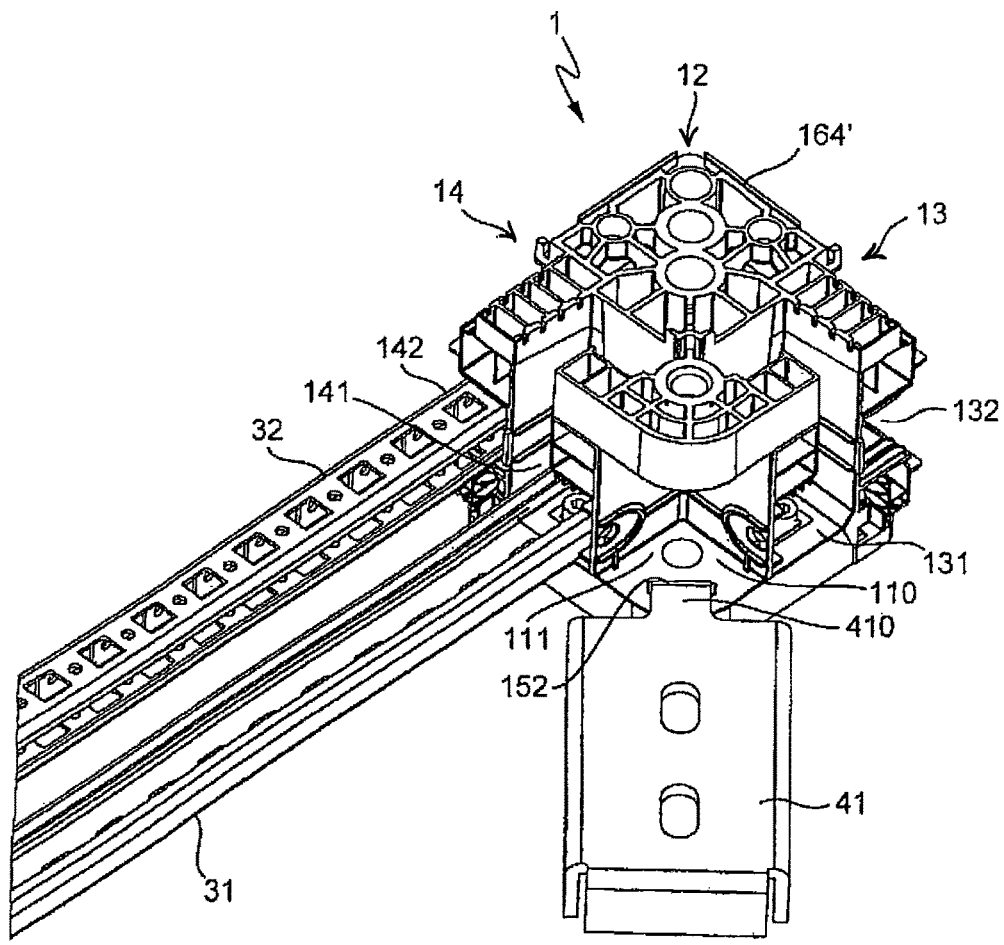

Second corner space 110 in (in so far virtual) second corner region 11 is formed in that additional wall sections integrally connect to the interior sides of the ends of first and second mounting face 13, 14, facing away from one another. As e.g. shown in FIG. 1A, the already described receiving chambers 131, 141 are arranged in these regions, wherein i.e. in the depth of the receiving chambers inwardly protruding wall sections are present. Between the wall sections, at the ends facing towards another, the second corner space 110 is formed as a free space. This free space is laterally confined by second corner region bordering walls 112, 112' which are parallel to the adjacent mounting faces 13, 14 and oriented in z direction, and confined in z direction by means of the first and second base wall section 150, 160, wherein fixing holes 111 leading to receiving chambers 131, 141 are introduced are introduced into corner region bordering walls 112, 112', and slot 152 is introduced into a side of the first base wall section 150 facing towards the second corner space 110, wherein an anchoring claw 41 having an angled flat retaining lug 410 (cp. FIG. 7) for anchoring an installed construction unit to a supporting surface can be inserted. In the second corner region 11, interior regions of both base sections 150, 160 of a construction unit are rounded (so that in this respect the mathematically precise corner is only virtual). Also second inner corner space 110 offers advantageous possibilities for mounting and can be easily accessed, e.g. from the interior of a switchgear cabinet after removal of a bottom plate which optionally covers a socket. Access is also created after removal of a lateral cover. Alternately, second corner space 110 can be formed by means of wall sections running at an angle with respect to x-y direction and z direction or by only one wall section running at an angle.

By means of base wall sections 150, 160 extending also across corner spaces 11, 12, large receiving regions for building extensions on both sides in z direction or a support on an underlay are achieved on their exterior or base face 15, 16, respectively. Cavities 153, 163 and bores 151, 161 having respectively relative thin wall sections result in stable support structures in particular in z direction as a honeycomb structure type, however, the cell-like cavities being not identical, but can be used as differently embodied functional regions with the receiving structures, including those regions of base wall sections 150, 160 extending across corner spaces 110, 120. In the center region between corner spaces 110, 120, the wall regions surrounding cavities 153, 163 or bores 151, 161, respectively, form optionally continuous supporting structures in z direction between both base faces 15, 16 or supporting structures supported by wall sections extending parallel to base faces 15, 16. Wall sections running in x direction and y direction are also relatively thin and result, together with reinforcing ribs, also in x direction and y direction a high stability with relatively small use of materials and accordingly relatively light construction of the mounting piece. In particular, if configured as a plastic molded part, apart from relatively thin wall sections, it is ensured that transition regions, such as crossing and corner regions between wall sections include material volumes as small as possible, so that the molding process is promoted at high dimensional stability. Structures and materials as mentioned, in particular plastics or composite materials, of the mounting piece 1 further result in benefits of vibration isolation with respect to vibrational and damping properties.

As shown in FIG. 4, identical or different mounting elements can be attached at mounting pieces 1 in different combination, wherein FIG. 4 shows covers 2, namely a corner cover 21 having a first and a second leg, as well as side covers 22 having a cover wall 220 and cover fixing elements 221 formed in the interior side facing to the mounting piece, rails 3, namely a mounting rail 32 having base legs 310, lateral legs 311 perpendicular thereto which in turn are provided with angled free end sections and rows 312 of holes provided in the base leg 310 and side legs 311, an anchoring means 4, namely an anchoring claw 41 having a front side flat retaining lug 410 at an angle, supporting means 6, namely a castor unit 61 with castor wheel 610, supporting plate 611 and retaining member 612, a leveling unit with leveling sleeve 620 and leveling bolts 621 as well as a cylinder-shaped thread insert 5 which can be inserted into a corresponding adapted bore 151, 161.

As shown in already mentioned FIGS. 5A and 5B, leveling unit 62 with leveling sleeve 620 and leveling bolt can be inserted e.g. into first corner region 12 when corner piece 1 is used e.g. for building up a socket 10. Leveling unit 62 protrudes into a bore existing at a respective location in upper base wall section 160, and with its adapted upper bolt section, into the lower section of leveling bolt 621 into bore 151 aligned therewith in z direction. For easy insertion, an open recess 156 is provided on the upper side of the lower base wall section 150 which is open towards the respective mounting face 13, 14. Leveling sleeve 620 is supported at those regions of base wall section 160 surrounding bore 161 with its band-like upper side, while leveling bolt 621 with its lower end section, protrudes respective bore 151 downwardly and can be screwed in or out more or less by means of a tool engaged on a hexagonal section of leveling unit 62.

Figure 6:
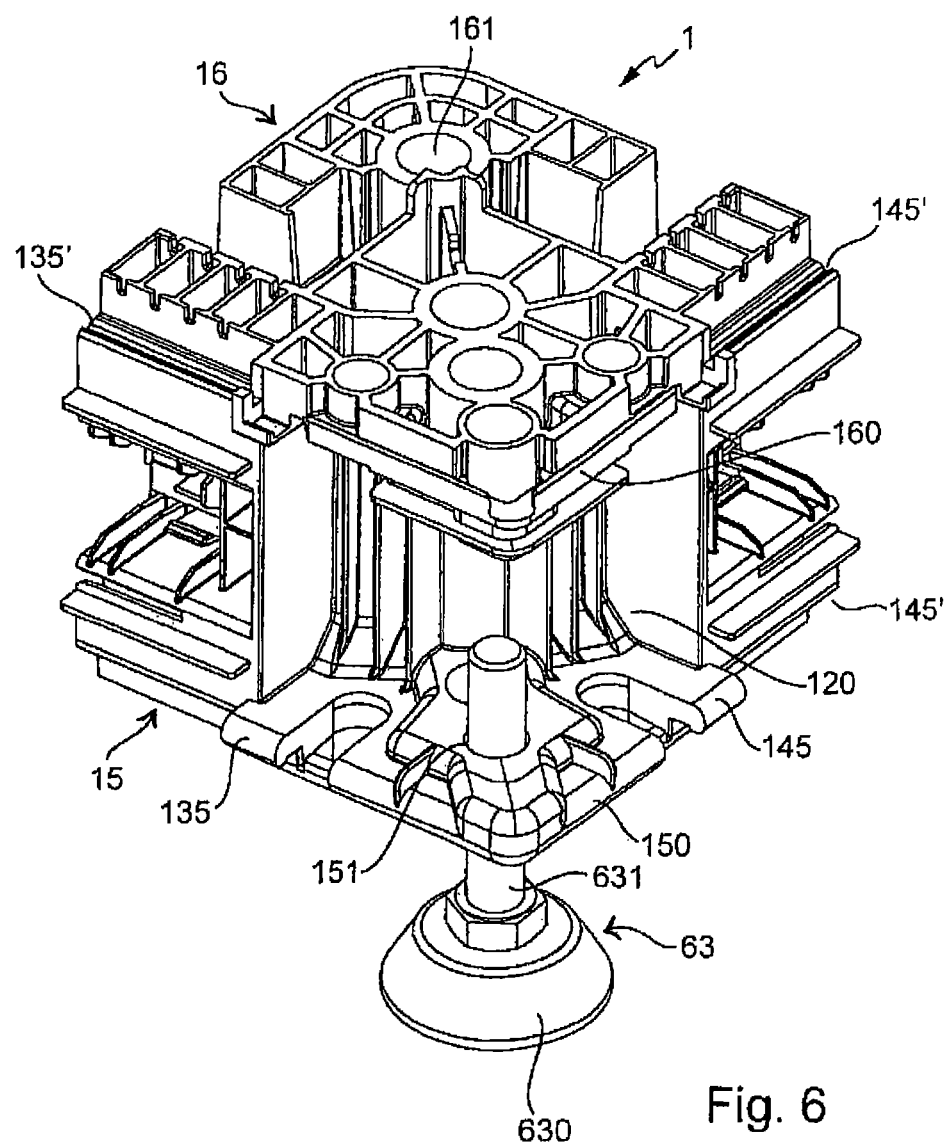

FIG. 6 shows a supporting stand 63 inserted into first corner region 12 as a supporting means 6, having a stand plate and a stand pin 631 protruding through a corresponding bore 151.

FIG. 7 shows a corner region of a partly assembled construction unit, for example a socket 10, comprising a mounting piece 1, rails 3 connected thereto via receiving chambers 141, 142, namely a C-rail 31 and a mounting rail 32, and an anchoring means here in form of an anchoring claw 41 which engages slot 152 in lower base wall section 150 in the inner corner region 11 with an angled flat retaining lug 410, which slot is adapted thereto in size and shape to a large extent. Such a construction unit, a socket 10 or mounting frame, offers advantages in the installation of electrical components and/or air-conditioning components or energy storage components, e.g. for attachment, using retain struts, if needed, which can be easily mounted at mounting rails 32.

Figure 8A:
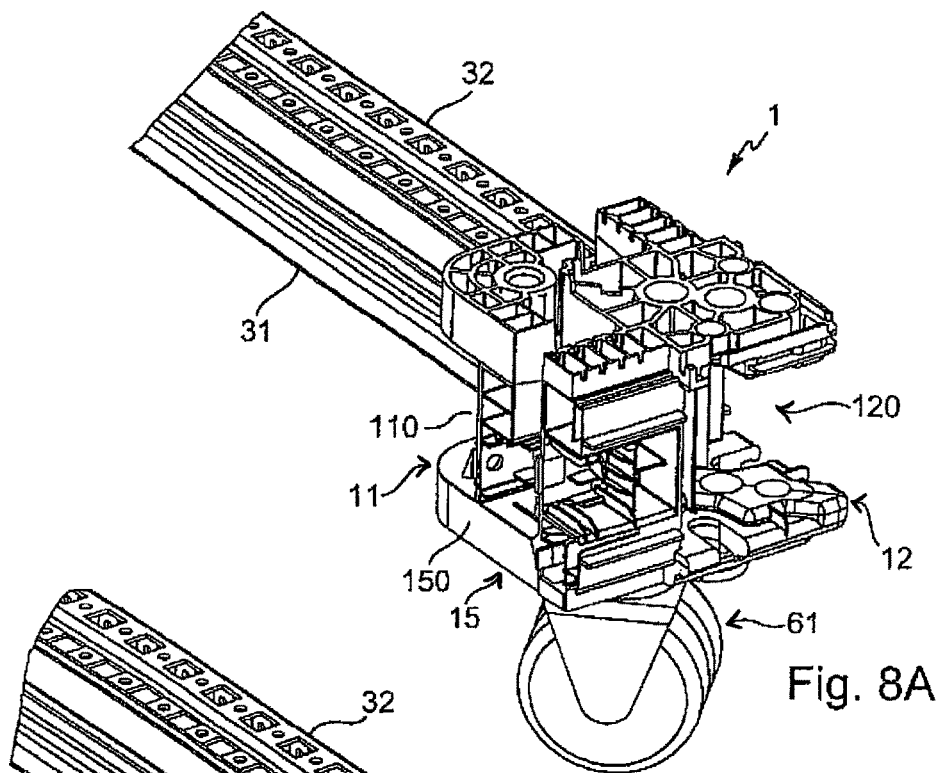
Figure 8B:
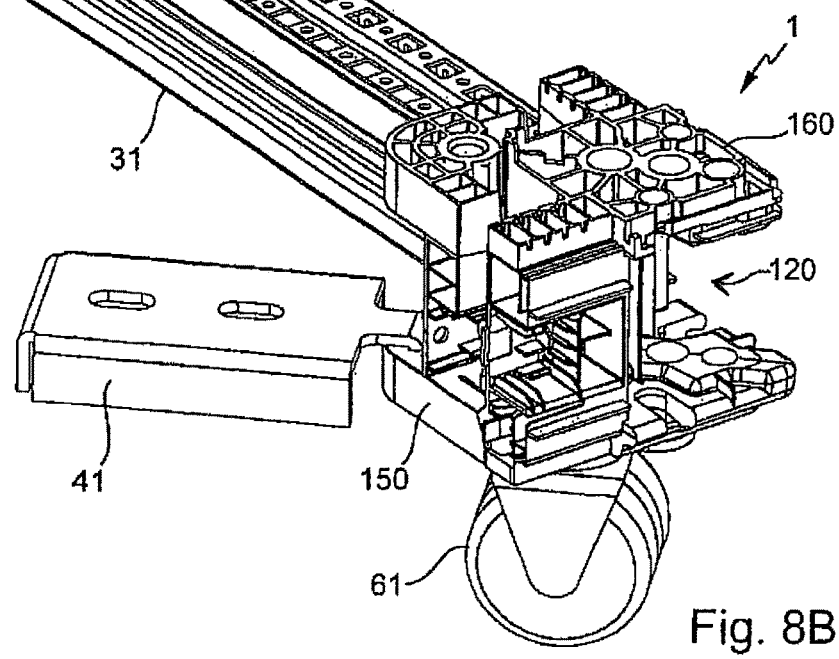

Also in construction units which are partly assembled and in sections shown in FIGS. 8A and 8B, a C-rail 31 and a mounting rail 32 are coupled to a mounting piece 1. A castor unit 61 is attached beneath mounting piece 1. Further, in FIG. 8B an anchoring claw 41 mounted to mounting piece 1 is illustrated.

Figure 9A:
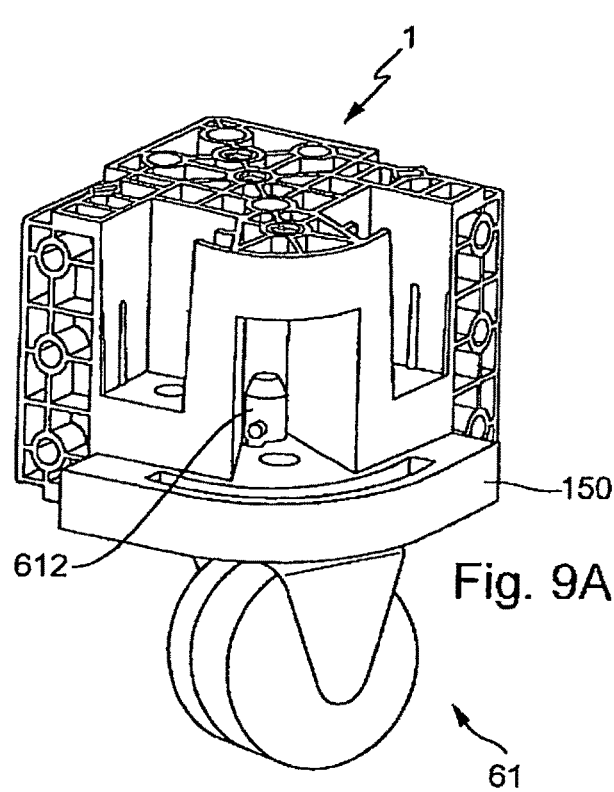
Figure 9B:
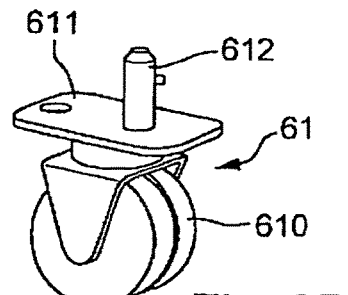
Figure 9C:
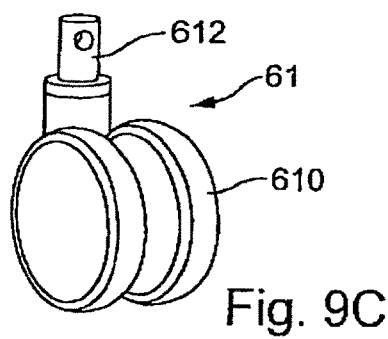
Figure 9D:
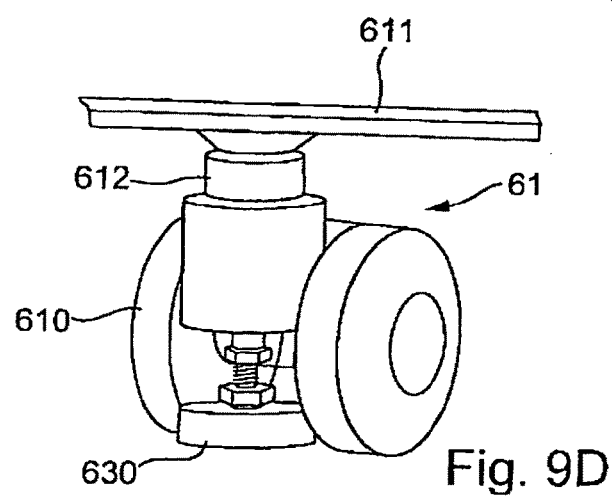

FIGS. 9A to 9D show different embodiments of castor units 61 wherein in FIG. 9A a castor unit 61 mounted at a mounting piece 1 is illustrated. Castor unit 61 protrudes through a bore 151 in the lower base wall section 150 in inner corner region 110 with a bolt-shaped retaining member 612. The retaining member comprises some type of bayonet connection, bore 151 being accordingly adapted for passing a protruding cross bolt. FIG. 9B shows a correspondingly embodied castor unit 61 with supporting plate 612 and retaining member 612 with bayonet connection. FIG. 9C shows a castor unit with bayonet connection without supporting plate and FIG. 9D a castor unit with additional leveler with stand plate 630.

Figure 10A:
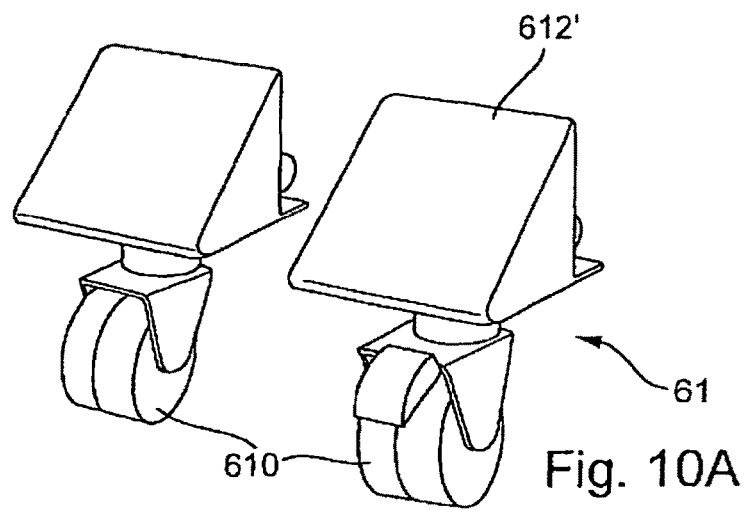
Figure 10B:
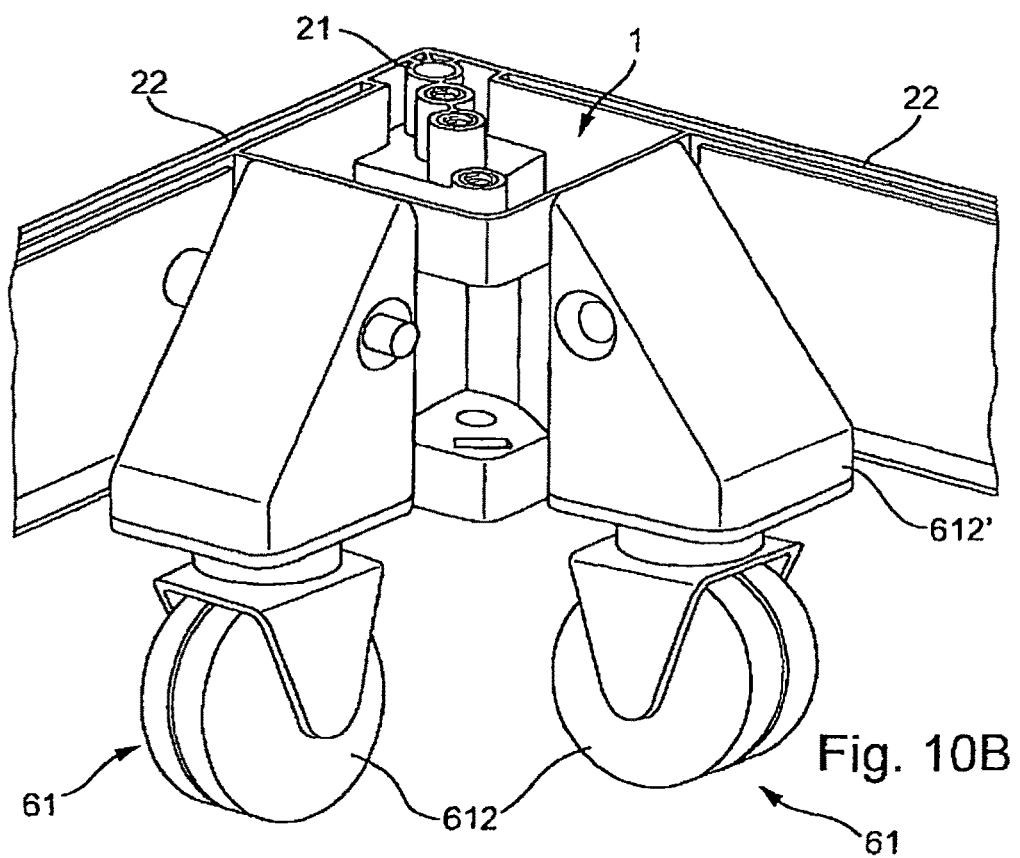

Alternate exemplary embodiments for castor units 61 are shown in FIGS. 10A and 10B which can be engaged and attached, with block-like retaining member 612', laterally to wall regions of mounting piece 1 merging into the second corner region 11.

In FIGS. 11A and 11B, further sections of a corner region of a part assembled construction unit, for example a socket, are illustrated, wherein rails 3, namely C-rails 31 and mounting rails 32 are attached or can be attached, respectively, at both mounting faces 13, 14. FIG. 11C shows a corresponding lateral view. As apparent from the Figs., mounting rail 32 can easily be inserted into a respective receiving chamber 132 or 142, respectively of mounting piece 1 even later on after having removed an optionally existing cover. Mounting rail 32 locks onto resilient locking pin 135" or 145", respectively.

FIG. 12A shows a construction unit which is square in a top view, as an example a socket 10, with mounting pieces 1 arranged in four corner regions and intermediate elements in form of C-rails 31 and mounting rails 32 connecting them, as previously explained, coupled to corner pieces 1 with their end sections. FIG. 12B shows a socket 10 from one side while FIGS. 12C and 12D reproduce sections of the corner regions of socket 12 in an enlarged illustration. For example, relatively narrow configured C-rails 31 can be introduced with their narrow sides from above into gaps 165 and then, if needed after lateral displacement, be interiorly fixed in respective receiving chambers 131, wherein they are rearwardly engaged by relevant locking catches 135" on their one side and are fixed (cp. also e.g. FIG. 1A). Advantageously, C-rails can be used in the socket region of a switchgear cabinet for securing lines, such as e.g. electrical cables. Rows 312 of holes having square or rectangular holes in a defined spacing and optionally intermediate round holes are advantageously aligned with corresponding holes or rows of holes, respectively, of mounting rails or frame profiles of the switchgear cabinet or the framework thereof, respectively. As may be recognized in FIG. 12D, the outside second corner region 120 is free for access from front end side, after optional covering cover elements have been removed.

A respective construction unit, for example a socket 10, as in FIG. 12A, is also shown in FIG. 13, but in a perspective top view. On the upper outside, a presently square support surface with receiving structures is formed, when in the outer frame region ledge-like protrusions 164' extending in x direction and y direction are molded to the upper base wall section 160. Adjusting screws or connection screws are inserted into interior corner spaces 110 in relevant bores 151, as may be recognized from corner space 110 illustrated rearwardly in the Fig. (at the upper side on the drawing sheet).

FIGS. 14A and 14B show further exemplary embodiments of construction units in form of partly assembled sockets 10. In FIG. 14A, a rectangular socket having mounting rails 32 as connecting elements is shown, whereas FIG. 14B shows a square socket 10 having mounting rails 32 and C-rails 31 as intermediate elements or connecting elements, respectively. Respective corner pieces 1 are arranged in the corners according to the previously described embodiment.

Figure 15A:
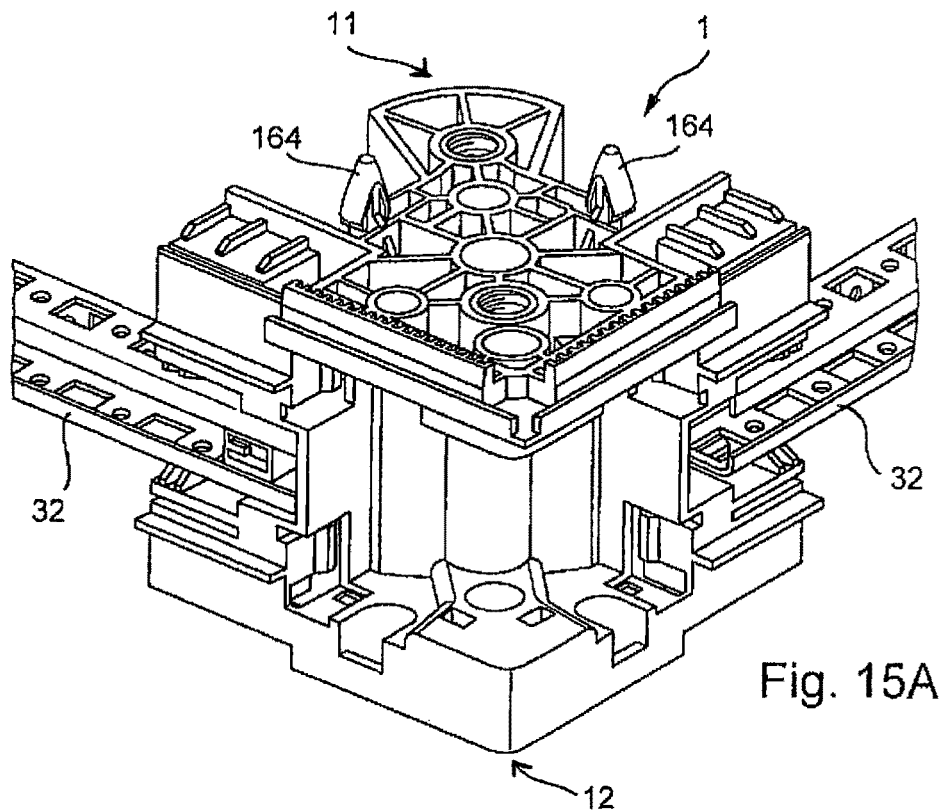
Figure 15B:
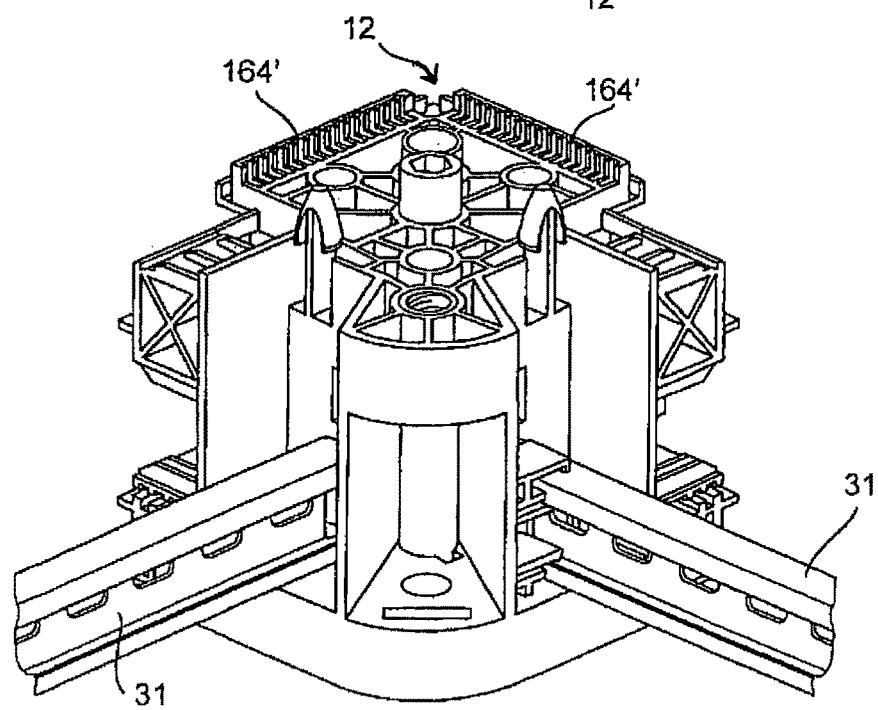
Figure 17D:
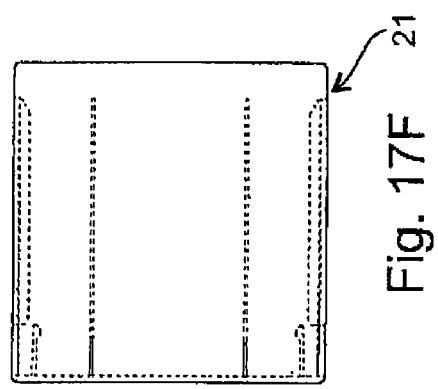
Figure 17E:
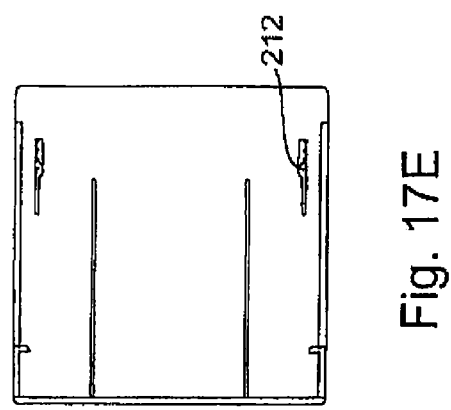
Figure 17F:
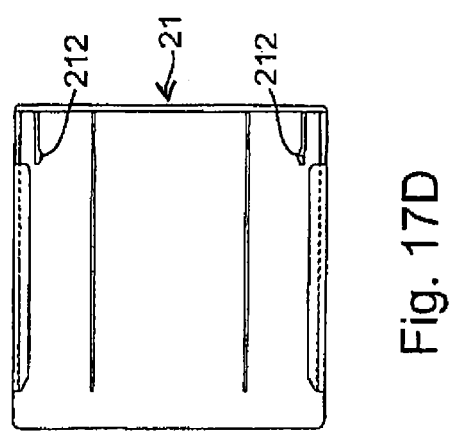

FIGS. 15A and 15B, interned, show corner regions of a construction unit with mounting rails 32 or C-rails 31, respectively, coupled thereto. Thread inserts made of metal are inserted into some of the bores 161. An Allen screw is introduced into center bore 161, as shown in FIG. 15B. By taking those measures, mounting of e.g. a frame section of a frame work can be made on the upper side of the mounting piece. Protrusions 164, 164' define abutment positions and result in a precise positioning.

FIGS. 16A and 16B illustrate a cut-out of an arrangement of covers 2 at a mounting piece 1, wherein in FIG. 16A the corner region illustrated in FIG. 16B is enlarged. Cover arrangement 2 comprises two lateral covers 22 which are mounted to the mounting faces 13, 14 of mounting piece 1, as well as a corner cover 21 which covers the outer corner space 120 outwardly in an assembled state.

Figure 18A:
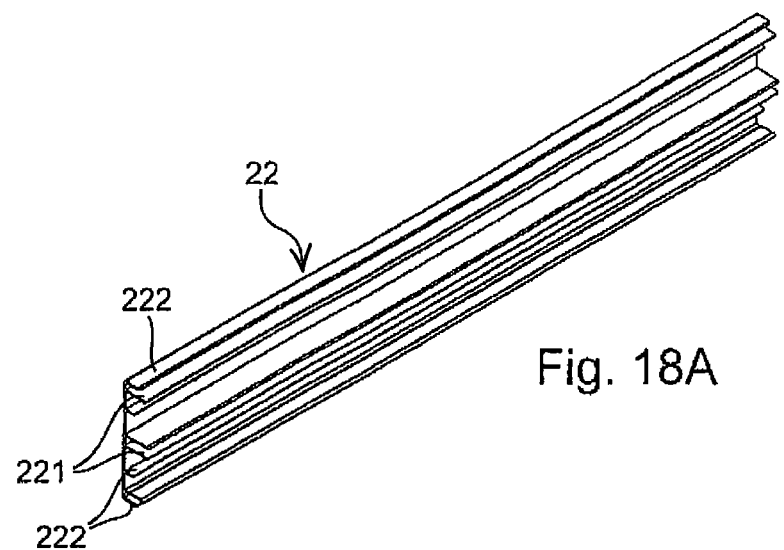
Figure 18B:
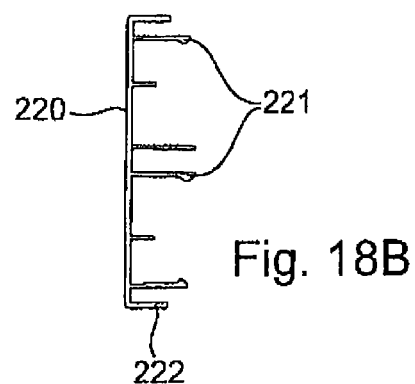

Preferably, lateral covers, as also shown in FIGS. 18A and 18B, are made as metal profile sections or preferably made of plastics (or even of compound material, such as fibers of artificial material or renewable raw materials embedded into a plastic matrix), comprising a flat cover wall 220 on their outside, wherein cover fixing element 212 or reinforcing ribs 222, respectively, are molded to the inner side. Stiffening ribs 222 or cover fixing elements 221 can also protrude perpendicular in the longitudinal edge regions of cover wall 220, as may be recognized in FIG. 16A. Also, cover fixing elements 221 may serve as reinforcing elements, so that it is possible to do without other individual stiffening ribs. Ledge-like cover fixing elements 221 are provided with locking pins at their free end sections comprising, towards their free end, e.g. in insert direction, flat insert slopes and, opposite to the insert direction, more or less steep locking flanges. Ledge-like cover fixing elements 221 advantageously form resilient locking tongues which can be deflected against their elastic spring forces. They cooperate with locking structures arranged at mounting faces 13 or 14, respectively, to which they are adapted. In the exemplary embodiment, this is achieved e.g. by ledge-like locking catches 135', 145' which are open downward or upward, respectively (with respect to the z direction) and which lockingly snap into oppositely directed locking pins of two respective cover fixing elements 221. Stiffening ribs 222 and ledges protruding from mounting faces 13, 14 may serve for stable support in a precise position. FIGS. 18A and 18B show lateral covers 22 from the inside or from the front end, respectively.

Preferably, also corner cover 21 is made as a molded part of metal or preferably of plastic (or even of the mentioned composite materials). First and second legs 210, 211 are also formed by a cover wall 220 which is flat on its outside and corresponds in its height (z direction) essentially to the height of the lateral covers 22. On the inner side of legs 210, 211, tongue-like or ledge-like protruding corner cover fixing elements 212 as well as ledge-like stiffening ribs 213 are molded, as can be seen in particular in FIGS. 17A to 17F. Corner cover fixing elements 212 form preferably resilient locking protrusions with locking pins molded to the cover wall, wherein two locking protrusions 212 spaced apart in z direction are oriented opposite to one another with their locking pins and snap into correspondingly positioned grooves or locking protrusions, respectively, on the mounting faces 13, 14, when inserted. Also, the locking pins of the corner cover fixing elements 212 are provided with flat insertion slopes in insert direction and preferably also carry steeper locking flanges on their sides arranged opposite to the insert direction. For example, locking catches 135, 145 and 133, 143 on the outside of mounting faces 13, 14 serve as locking protrusions for snapping in corner covers 21.

Advantageously, the covers can be formed to perform switchgear cabinet functions, for example can be provided with ventilation openings and/or recesses or receptacles of grids, conditioning mats, fans or the like.

FIG. 19A shows a cut-out of a corner region of a construction unit comprising mounting rails 32 and C-rails 31 mounted to a mounting piece 1 as well as removed lateral covers 22 and a corner cover 21. FIG. 19B shows a socket 10 having covers 21, 22 mounted thereto and comprising C-rails 31 and mounting rails 32. Corner covers 21 cover the respective outer corner spaces 120 of corner pieces 1. Lateral covers can additionally abut at intermediate elements, for further support, in particular to mounting rails 32, and can optionally be locked therewith. Thereby, an additional stabilization of lateral covers 22 is achieved.

Figure 20:
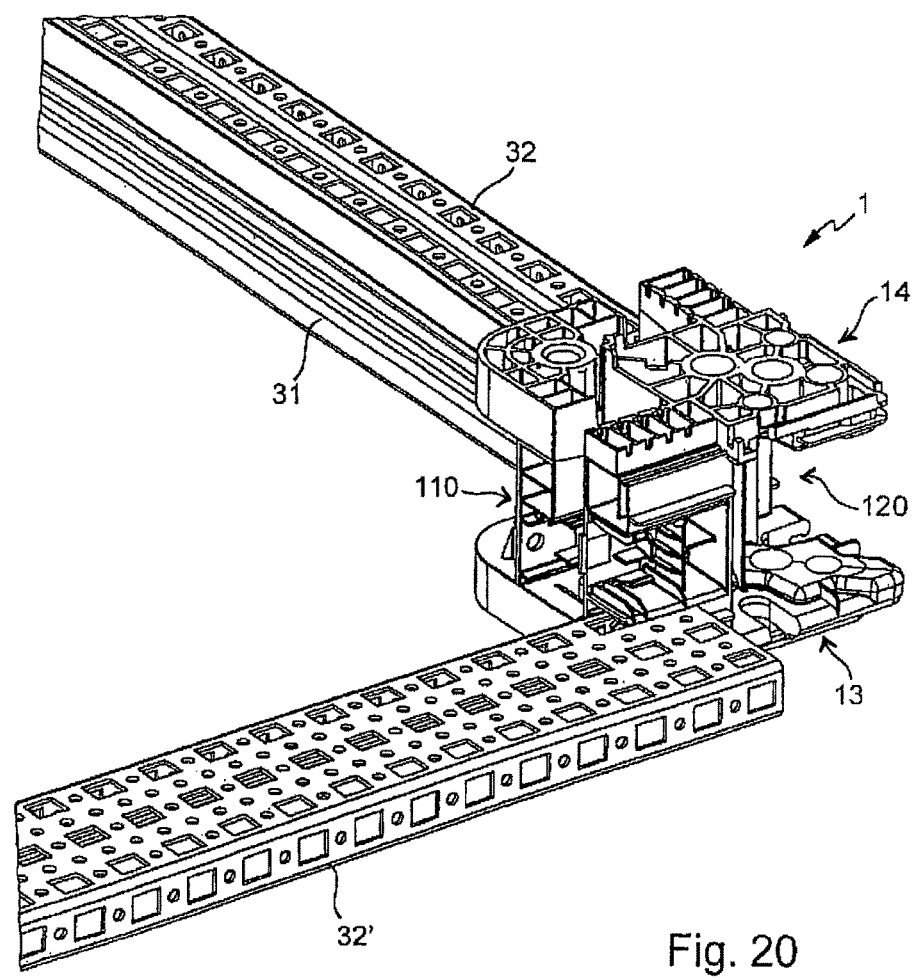
Figure 21:
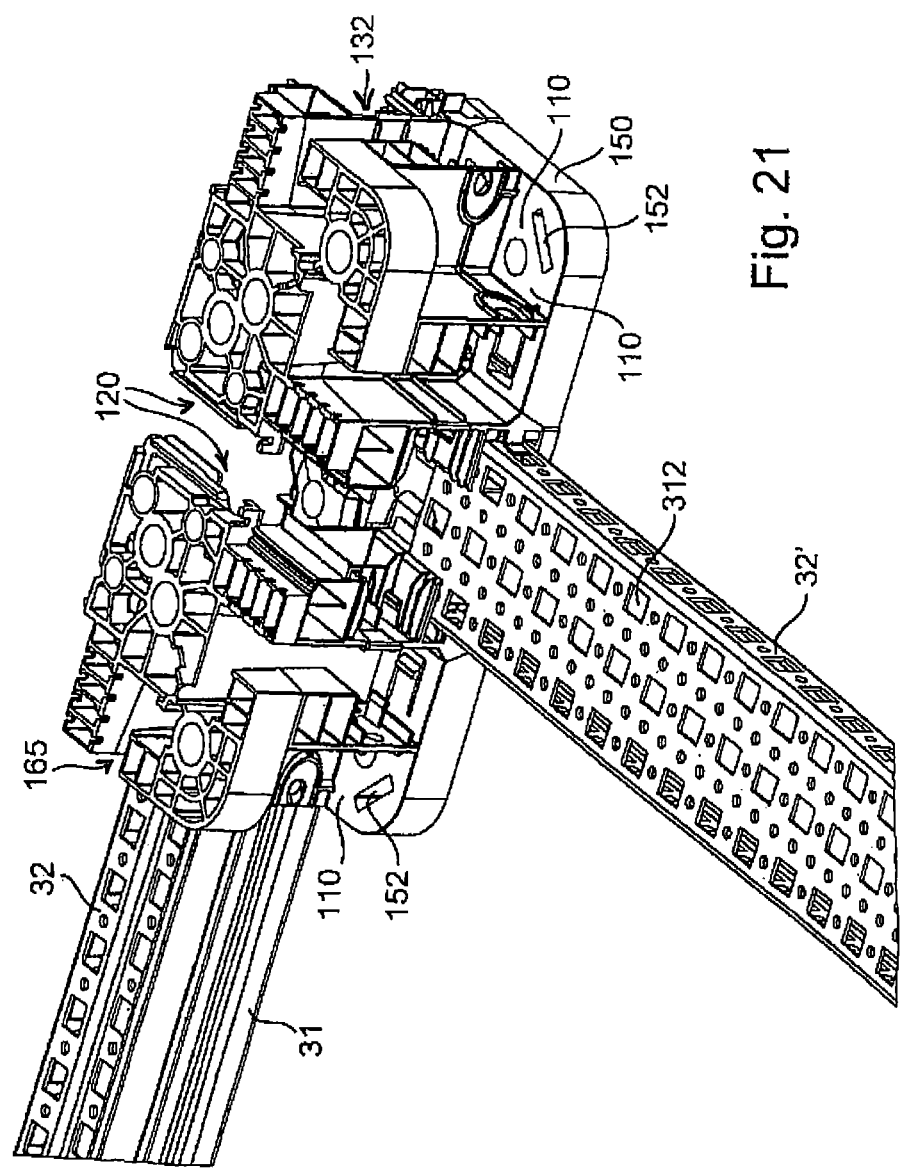

FIG. 20 shows a cut-out of another corner region of a construction unit. Herein, a mounting rail 32 and a C-rail 31 are mounted to a mounting piece 21 which their end sections at receiving chambers 141, 142 at the mounting face 14 of mounting piece 1. In the lower region of mounting face 13, a wider mounting rail 32' is inserted into respective locking protrusions or grooves, respectively, and protrudes with its edge region facing away from the mounting face 13 so that it can be engaged with corresponding receiving structures on the mounting face of a neighboring corresponding mounting piece 1. In this way, a side-to-side sequence of construction units, such as e.g. sockets, in a defined arrangement and with stable connection is achieved. This is shown in FIG. 21, where the wide mounting rail 32' protrudes into the respective receiving chambers of neighboring mounting faces of two mounting pieces 1 and is locked therein. For locking, again protruding locking catches can be used which are molded to the mounting faces 13, 14 of mounting pieces 1 and which interact with holes of rows 312 of holes positioned in mounting rail 32'.

FIGS. 22A and 22B show various adapter elements 7 including adapter plates 70, 70' and connecting elements 71 adjusted therewith. FIG. 22A shows a substantially triangular adapter plate 70, whereas FIG. 22B shows a rectangular adapter plate 70'. The adapter plates comprise fixing holes as well as protruding protrusions on their flat sides. The protrusions and fixing holes are adjusted with complementary impressions on the upper and/or lower based surface 15, 16 of the mounting piece 1, e.g. also on their rim region, wherein the fixing holes are also aligned with suitable bores within the base surfaces 15, 16. By means of those or similar adapter plates, adjustments to various structures are coupled to mounting pieces 1 via adapter plates.

FIG. 22C shows a corner region of a framework 8 of a switchgear cabinet which has a vertical frame profile 81 and horizontal frame profiles 82, mounted or to be mounted on a mounting piece which is not shown. FIG. 22D shows a schematic cross section illustration of the vertical frame profile 81, wherein two essentially square or rectangular hollow chambers or profile sections 810, respectively, are connected to another via a diagonally extending connecting web 811. Having such a profile cross section, free spaces on the outside in a vertical edge region of a framework or switchgear cabinet, which are inside and outside, are formed which form advantageous mounting spaces for mounting installation elements, such as e.g. connection elements for side planking, hinges or locking elements. If the profile sections 810 are provided with narrow abutment or sealing ledges protruding outwardly, advantages are generated for close row mounting, as it is known from relevant applications of the applicant. The free space formed in the edge region is systematically preceded within vertical direction when assembling a construction unit or a socket 10 of the previously described construction with mounting pieces 1 comprising free corner spaces 120 in outer corner regions. Thereby, assembling benefits are generated.

FIG. 22E shows an example for using a bearing sleeve in a bore of corner piece 1 which may advantageously be used for receiving a connecting pin, for example of a castor unit 61 or a supporting stand 63.

Figure 23:
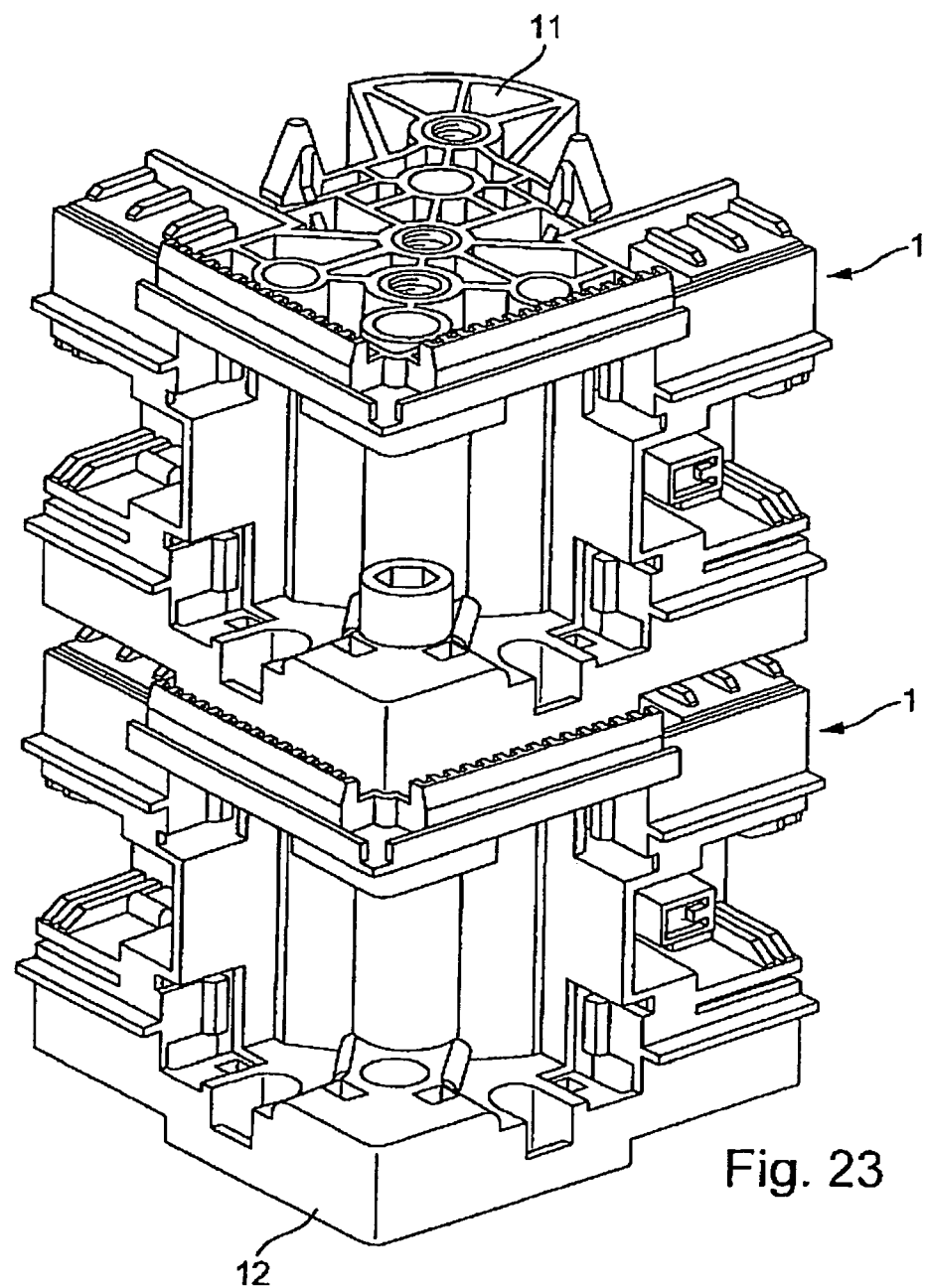

FIG. 23 shows row mounting of two mounting pieces 1 in z direction. Receiving structures on both base faces 15, 16 are adjusted to another so that the mounting pieces placed one above the other do not displace in x- and y direction and can easily be connected e.g. by means of a screw inserted into the corner spaces 110, 120 which (unv.) through the aligned bores 151, 161, as can be seen in FIG. 23, in particular, if thread inserts are inserted into bores 161 of the upper base wall section 160. In this way, construction units, such as e.g. socket 10, can be combined in a double or multiple row mounting and may reach a multiple height. They can be easily covered with respective covers of the previously mentioned constructions or with double or multiple covers.

FIG. 24A shows a lower section of a framework 8 of a rack or a switchgear cabinet mounted on a socket 10 with mounting pieces 1. The framework comprises vertical and horizontal frame profiles 81, 82 of the previously mentioned type, wherein vertical profiles 81 form free spaces in the outer edge region and inner edge region resulting in advantages assembling possibilities, as previously explained. The mounting pieces in turn offer free corner spaces 110, 120, as described. Mounting rails 32 are provided with rows 312 of holes having the same spacing as the hole screen provided in horizontal frame profiles 82 and vertical frame profiles 81, wherein hole screens of mounting rails 82 and horizontal frame profiles 82 are aligned with another at least in a vertical direction. Further, C-rails 31 for securing lines, in particular cables, are inserted into mounting pieces 1, as also previously explained. In the inner corner space of vertical frame profiles 81, connection screws are inserted into stabilizing receptacles positioned therein which proceed on the lower side of a lower frame of framework 8 formed by horizontal frame profiles 82 and engaged in accordingly positioned bores 161 with thread inserts 5 introduced therein. Connecting screws passing there through are advantageously positioned in the outer corner region 12 or the outer corner space 120, respectively. The upper side of the upper base surface 16 of mounting piece 1 is adapted to the bottom side of horizontal profiles 82 regarding its receiving structure, so that e.g. protrusions may engage into corresponding holes and/or the outer corner region of horizontal profiles 82 is in sections confined by outer ledge-like protrusions 164. FIG. 24B shows a lateral view of the lower section of framework 8 mounted on the socket, FIG. 24C a top view, and FIGS. 24D and 24E show, enlarged a corner region in a lateral view or in perspective view, respectively. Framework 8 can be connected with corner pieces 1 by means of screws, locking elements or clip elements and/or clamping elements.

Figure 25:
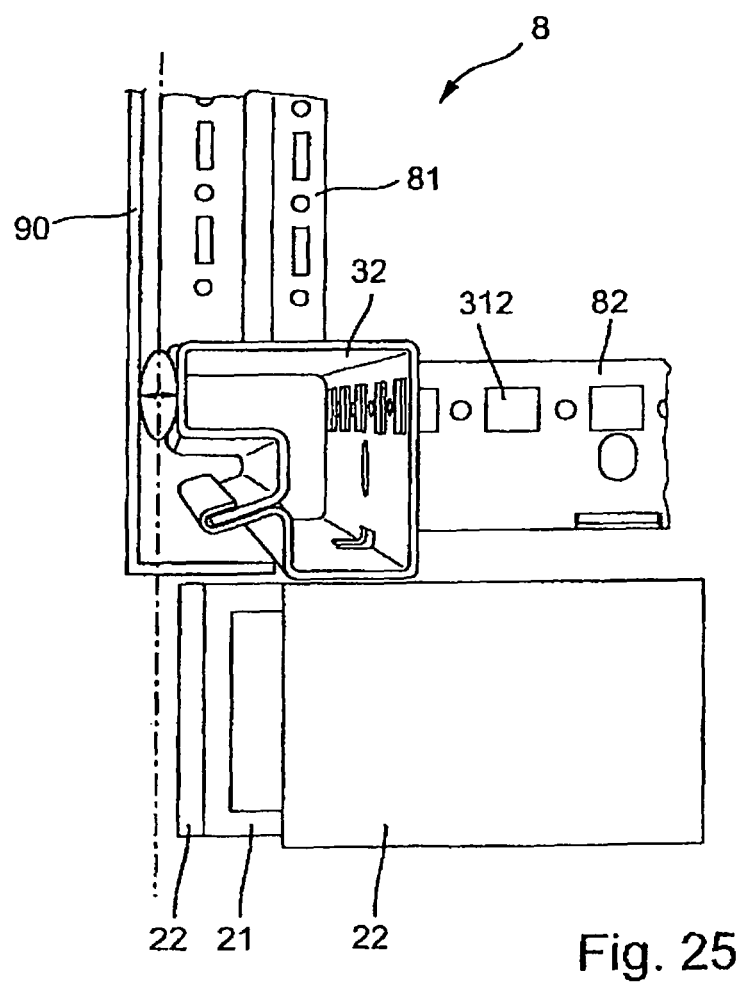

FIG. 25 shows another corner region of a framework 8 having horizontal frame profiles 82 and a vertical frame profile 81, mounted on a socket 10, wherein a horizontal profile extending perpendicular to the drawing plane is illustrated in cross section. It forms in its virtual outer edge region a continuous free space where only a ledge-like connection section is protruding, moreover, also in this region beneficial mounting possibilities are offered. The flat bottom side of horizontal profiles rests stably on the top surface of the socket, in particular also on the mounting pieces 1 (not shown in this illustration).

Figure 26:
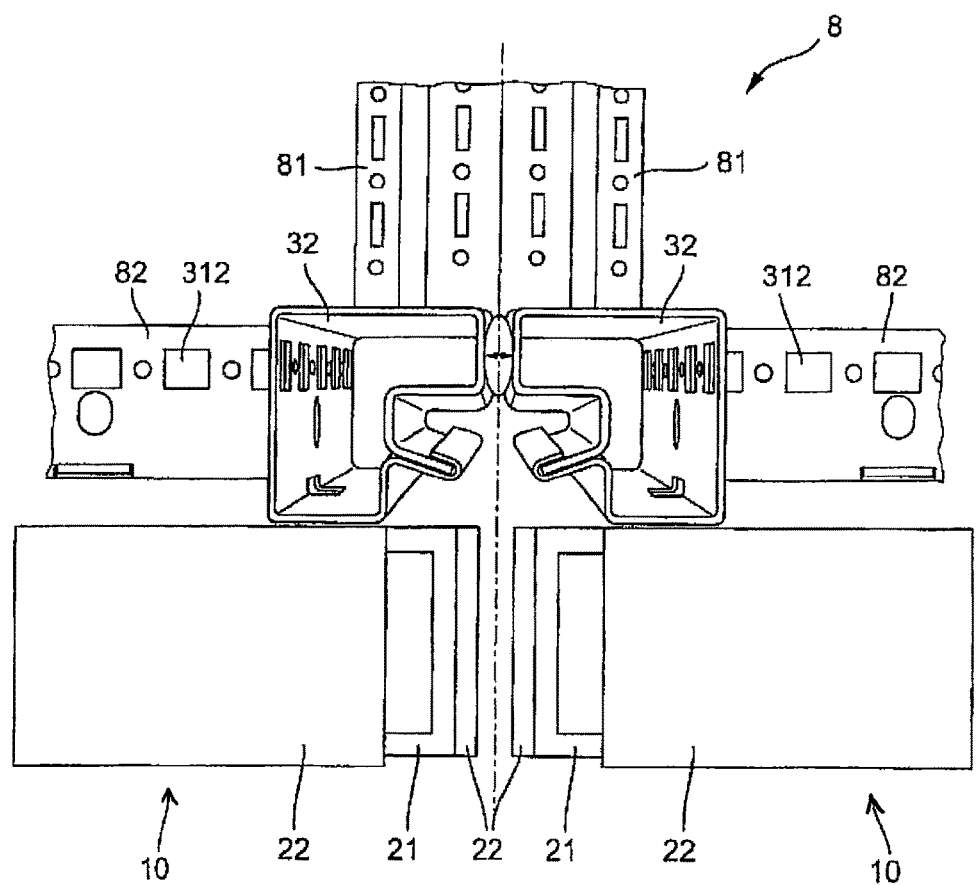

FIG. 26 shows a side-to-side arrangement with two neighboring sockets and frameworks 8 in a corner region. Horizontal frame profiles are opposite to one another, having narrow abutment bars between which a sealing element is introduced. They rest stably on a respectively associated top surface of two sockets 10 with their flat bottom surface. A row of sockets of e.g. benefits in pre-installation, so that frameworks or switchgear cabinets or racks in a row can be easily positioned and only need to be fixed.

Figure 27A:
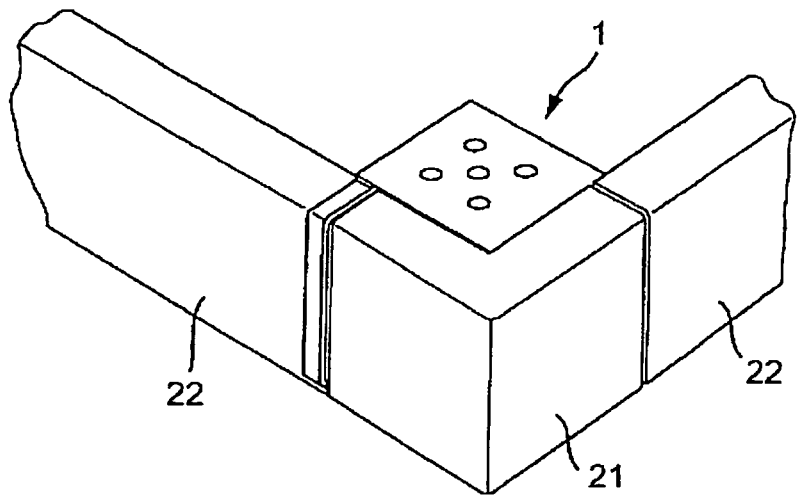
Figure 27B:
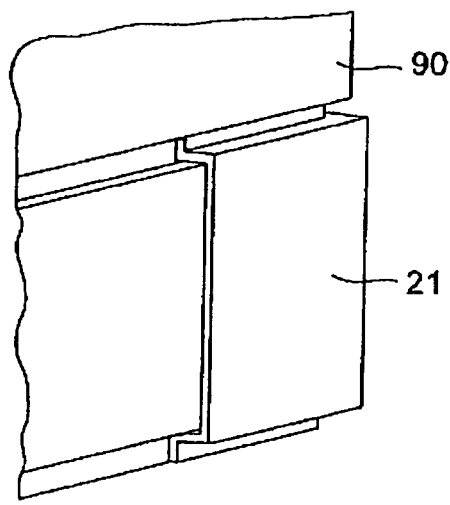
Figure 27C:
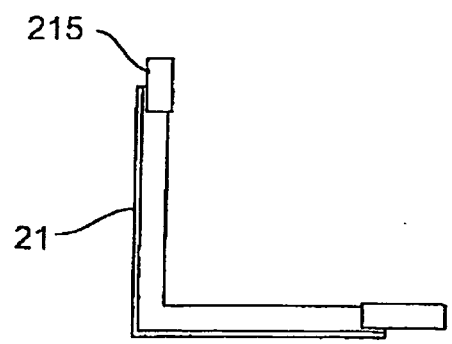

FIGS. 27A, 27B and 27C show corner region of a socket with a schematically illustrated mounting piece 1 to which a cover arrangement having lateral covers 22 and a corner cover 21 is mounted. In FIG. 27B, further a part of a switchgear cabinet wall arrangement 9 with switchgear cabinet wall element 90 is shown. FIG. 27C shows a corner cover 21 in a sectional view, wherein free end sections are offset inwardly by about the thickness of the wall section in a Z-shaped manner, so that the lateral blends can overlap the offset free end sections of corner covers 21, so that a flushing transition of the outer surfaces is achieved.

Figure 28:
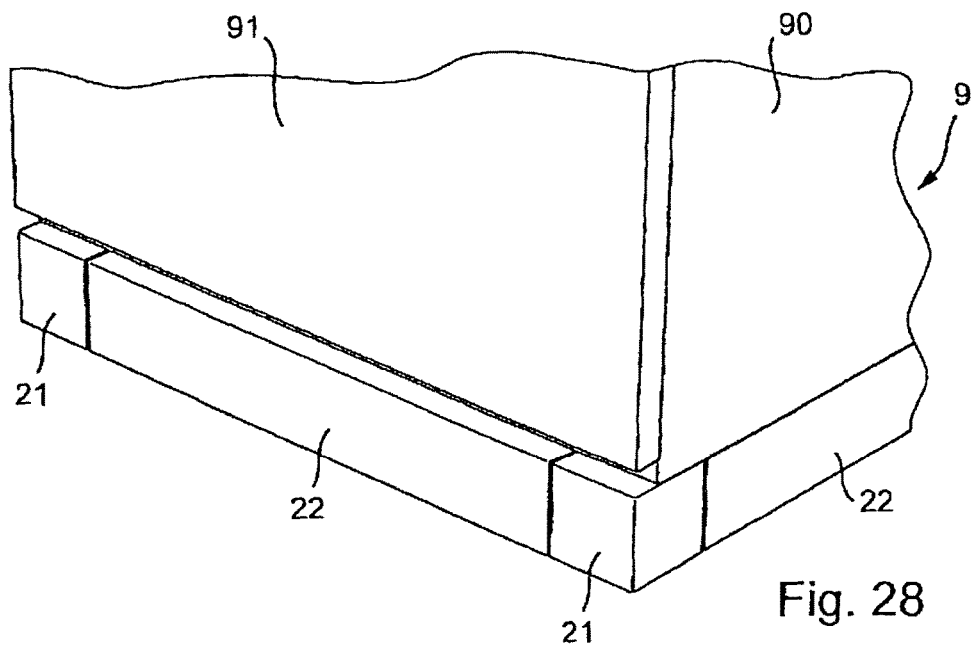

FIG. 28 shows a cut-out of a socket having lateral covers and corner covers, enlarged with respect to FIG. 27A, as well as a cut-out of a switchgear cabinet having a switchgear cabinet wall arrangement 9 with switchgear cabinet wall elements 91 and e.g. a door 91.

Figure 29:
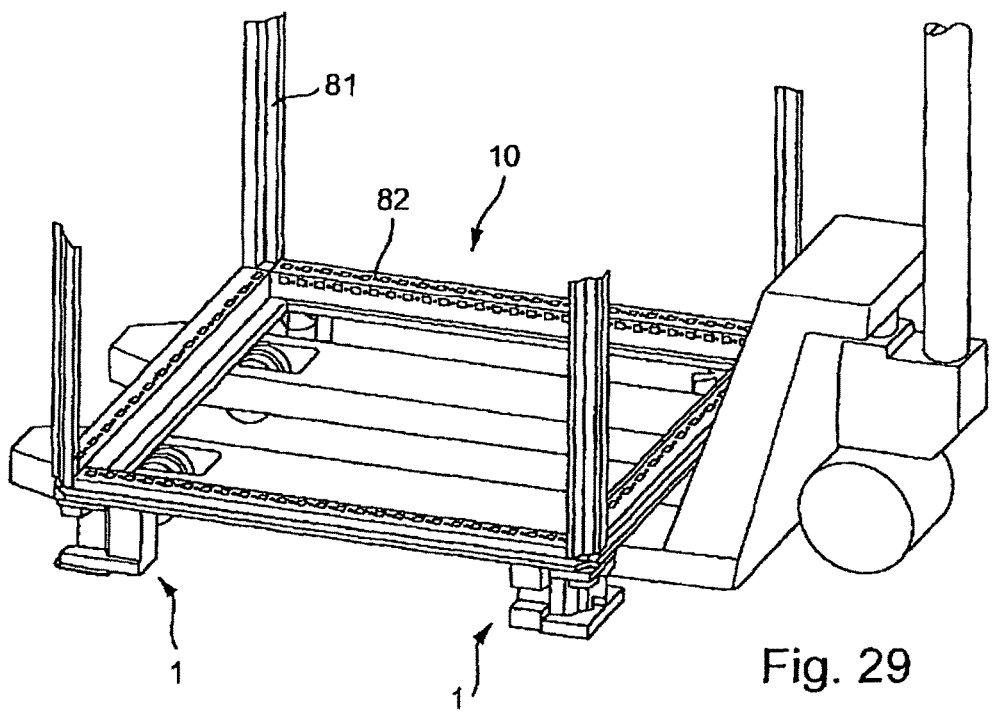

FIG. 29 shows a lower framework section mounted to an uncovered socket with mounting pieces 1, where in a socket region levers of lifting equipment are introduced. Mounting pieces 1 form advantageous distance pieces for introducing the levers similar to a pellet. Thereby, transporting benefits are generated.

A construction unit assembled by means of mounting pieces 1 can not only be used as a socket 10, but for example also as an intermediate frame between the frameworks 8 mounted above the other, or as a top part frame. Even a use as mounting frame is conceivable. The z direction of the mounting pieces may be oriented in horizontal direction, or the plane of the construction unit, such as mounting frame, may be vertically oriented.

The invention claimed is:

1. A mounting frame for a switchgear cabinet or a rack, comprising
    mounting pieces which are arranged, as corner pieces, in the four corner sections of a rectangle that extends in an x-y plane, said mounting pieces being produced in a respective shaping process and having outer first and second mounting faces which extend in the x direction and in the y direction at a right angle thereto and which extend in a space direction z at a right angle to the x-y plane, and are provided with hollow spaces which are at least partially surrounded by wall parts or bores that are oriented in the z direction, and comprising intermediate elements which extend between the mounting pieces in the x direction and in the y direction and the end sections of which are fastened to the mounting pieces,
    wherein the mounting pieces have wall sections which extend in parallel to the x-y plane and terminate in z-direction in a first and a second base face oriented in the x-y-plane, the second base face being parallel and spaced apart from the first base face by a distance,
    wherein the base faces form the outer face of at least a first and at least a second base wall section, the first and second base wall sections being parallel to and spaced apart from one another in the z direction,
    wherein the mounting faces are spaced apart from one another at their facing ends to define a first corner space in a first corner region,
    wherein the first base wall section comprises at least one bore, the second base wall section comprises at least one bore, and the at least one bore in the first base wall section are aligned with the at least one bore in the second base wall section,
    the first corner space being further defined by first and second corner region bordering walls, each of said first and second bordering walls defining a plane, wherein the plane of the first bordering wall is perpendicular to the plane of the second bordering wall,
    the corner region bordering walls being connected to one another and perpendicularly oriented with respect to each other in the z direction, with each of the corner region bordering walls being connected to and perpendicularly oriented with respect to each of the first and second base wall sections, and
    wherein the first corner space is confined in the z direction by the first and second base wall sections.

2. The mounting frame of claim 1, wherein at least one base face comprises receiving structures adapted to a facing section of a framework or a rack or that adapter elements are provided which, on one side thereof, are adapted to the receiving structures of the base face and, on the opposite side, are provided with adapter structures mating the facing section of the framework.

3. The mounting frame of claim 2, wherein the adapter elements comprise adapter plates.

4. The mounting frame of claim 2, wherein the receiving structures comprise formed protrusions on the base face which comprises the receiving structures.

5. The mounting frame of claim 2, wherein the receiving structures comprise first and second receiving chambers which are oriented perpendicularly to the first space direction (z) and parallel to the associated mounting face and which are at least partly surrounded by wall sections running in their orientation direction.

6. The mounting frame of claim 5, wherein intermediate elements are inserted into the receiving chambers.

7. The mounting frame of claim 6, wherein the intermediate elements comprise mounting rails having at least one row of holes or a rail having C-shaped cross section.

8. The mounting frame of claim 1, wherein the bores are provided with internal threads or with thread inserts.

9. The mounting frame of claim 1, comprising additional corner region bordering walls and wherein the mounting pieces comprise further perpendicularly connected wall sections at the interior of the ends of the first and the second mounting face facing away from one another, which wall sections are integrally connected to one another, and that the further wall sections leave a second corner space between their facing ends, which is laterally confined by the additional corner region bordering walls lying parallel to neighboring mounting faces and oriented in z direction and by the first and second base wall section in z direction.

10. The mounting frame of claim 1, wherein the mounting frame comprises lateral covers and corner covers made of plastics or metal that are positioned laterally and in the corner region and which are supported at the mounting piece or at a mounting rail.

11. The mounting frame of claim 1, wherein the mounting piece is formed as a plastic molded part.

12. The mounting frame of claim 1, wherein the at least one bore in the first base wall section and the at least one bore in the second base wall section are aligned vertically.

13. The mounting frame of claim 1, wherein the at least one bore in the first base wall section and the at least one bore in the second base wall section are located in the first corner space.

14. A method of forming a switchgear cabinet or a rack which comprises utilizing the mounting frame of claim 1 as a socket or intermediate frame of the switchgear cabinet or the rack.

15. A corner piece for a mounting frame for a switchgear cabinet or a rack, wherein corner pieces are arranged in the four corner sections of a rectangle that extends in an x-y plane, the corner pieces being produced in a respective shaping process and having outer first and second mounting faces which extend in the x direction and in the y direction at a right angle thereto and which extend in a space direction z at a right angle to the x-y plane, and are provided with hollow spaces which are at least partially surrounded by wall parts that are oriented in the z direction, and comprising intermediate elements which extend between the mounting pieces in the x direction and in the y direction and the end sections of which are fastened to the corner pieces, the corner piece comprising:

wall sections which extend in parallel to the x-y plane and terminate in the z-direction in a first and a second base face oriented in the x-y-plane, the second base face being parallel and spaced apart from the first base face;

a portion of the first base face forming a first base wall section, and a portion of the second base face comprising a second base wall section, the first and second base wall sections being parallel to and spaced apart from one another;

the corner piece further comprising first and second corner region bordering walls, each of said first and second bordering walls defining a plane, wherein the plane of the first bordering wall is perpendicular to the plane of the second bordering wall;

the corner region bordering walls being connected to one another and perpendicularly oriented with respect to each other, with each of the corner region bordering walls being connected to and perpendicularly oriented with respect to each of the first and second base wall sections; and the corner region bordering walls and the first and second base wall sections defining a first corner space;

wherein the first base wall section comprises at least one bore, and the second base wall section comprises at least one bore, and the at least one bore in the first base wall section are aligned with the at least one bore in the second base wall section, and wherein the first corner space is confined in the z direction by the first and second base wall sections.

* * * * *